US012034996B2

(12) United States Patent
Chen

(10) Patent No.: US 12,034,996 B2
(45) Date of Patent: Jul. 9, 2024

(54) VIDEO PLAYING METHOD, APPARATUS AND DEVICE, STORAGE MEDIUM, AND PROGRAM PRODUCT

(71) Applicant: Tencent Technology (Shenzhen) Company Limited, Shenzhen (CN)

(72) Inventor: Fasheng Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/979,657

(22) Filed: Nov. 2, 2022

(65) Prior Publication Data
US 2023/0057963 A1 Feb. 23, 2023

Related U.S. Application Data

(63) Continuation of application No. PCT/CN2022/079719, filed on Mar. 8, 2022.

(30) Foreign Application Priority Data
Mar. 31, 2021 (CN) .......................... 202110351819.2

(51) Int. Cl.
*H04N 21/431* (2011.01)
(52) U.S. Cl.
CPC ................................ *H04N 21/431* (2013.01)
(58) Field of Classification Search
CPC .................................................. H04N 21/431
USPC ......................................................... 725/37
See application file for complete search history.

(56) References Cited

U.S. PATENT DOCUMENTS

| 6,062,863 A * | 5/2000 | Kirksey ................. G09B 5/065 434/167 |
| 11,700,426 B2* | 7/2023 | Williams ........... H04N 21/8547 725/37 |
| 2014/0245367 A1* | 8/2014 | Sasaki ................ H04N 21/2343 725/109 |
| 2016/0227282 A1* | 8/2016 | Chang ................ H04N 21/4334 |
| 2019/0387267 A1* | 12/2019 | Shusman ........... H04N 21/2668 |
| 2020/0159398 A1* | 5/2020 | Shimomura ............ G06F 3/165 |

(Continued)

FOREIGN PATENT DOCUMENTS

| CN | 104035690 A | 9/2014 |
| CN | 104811816 A | 7/2015 |

(Continued)

OTHER PUBLICATIONS

Tencent Technology, ISR, PCT/CN2022/079719, May 30, 2022, 3 pgs.

(Continued)

*Primary Examiner* — Dominic D Saltarelli
(74) *Attorney, Agent, or Firm* — Morgan, Lewis & Bockius LLP

(57) ABSTRACT

This application provides a video playing method performed by a computer device. The method includes: playing a target video in a playing interface; when a video picture of the target video comprises a target object and there is a text associated with the target object, displaying the text in a display region associated with a face posture of the target object in a process of playing the target video; and adjusting a display posture of the text with the face posture when the face posture of the target object changes in a process of displaying the text.

20 Claims, 19 Drawing Sheets

(56) References Cited

U.S. PATENT DOCUMENTS

| | | | |
|---|---|---|---|
| 2022/0107681 A1* | 4/2022 | Ronnau | G06T 19/20 |
| 2023/0276102 A1* | 8/2023 | Chen | G06T 7/70 |
| | | | 725/34 |

FOREIGN PATENT DOCUMENTS

| | | | |
|---|---|---|---|
| CN | 104935997 A | 9/2015 | |
| CN | 107181976 A | 9/2017 | |
| CN | 109819342 A | 5/2019 | |
| CN | 113709544 A | 11/2021 | |
| EP | 3264783 A1 | 1/2018 | |

OTHER PUBLICATIONS

Tencent Technology, WO, PCT/CN2022/079719, May 30, 2022, 5 pgs.

Tencent Technology, IPRP, PCT/CN2022/079719, Oct. 3, 2023, 6 pgs.

* cited by examiner

VIDEO PLAYING METHOD, APPARATUS AND DEVICE, STORAGE MEDIUM, AND PROGRAM PRODUCT

CROSS-REFERENCE TO RELATED APPLICATIONS

This application is a continuation application of PCT Patent Application No. PCT/CN2022/079719, entitled "VIDEO PLAYBACK METHODS, DEVICES, DEVICES, STORAGE MEDIA AND PROGRAM PRODUCTS" filed on Mar. 8, 2022, which claims priority to Chinese Patent Application No. 202110351819.2, filed with the State Intellectual Property Office of the People's Republic of China on Mar. 31, 2021, and entitled "VIDEO PLAYBACK METHODS, DEVICES, DEVICES, STORAGE MEDIA AND PROGRAM PRODUCTS", all of which are incorporated herein by reference in their entirety.

FIELD OF THE TECHNOLOGY

This application relates to the field of computer technologies, and particularly relates to a video playing method, apparatus and device, a computer-readable storage medium, and a computer program product.

BACKGROUND OF THE DISCLOSURE

With the development of the Internet technology, media information dissemination based on intelligent terminals is becoming more and more common. For example, a video may be played through a mobile phone terminal. In a process of playing the video, some text information, such as bullet-chat screens and captions, may be usually presented in a video picture.

In related technologies, when some text information is presented in a video picture, the text information is usually displayed in a specific region of the video picture, for example, at the top of the video picture or at the bottom of the video picture. For some text information associated with an object in the video picture, a user may not obtain the object associated with the text information.

SUMMARY

The embodiments of this application provide a video playing method, apparatus and device, a computer-readable storage medium, and a computer program product, which may realize the associated display of a text and the face of a target object, and improve the display effectiveness and flexibility of the text.

Technical solutions of the embodiments of this application are implemented as follows:

An embodiment of this application provides a video playing method performed by a computer device, including:
  playing a target video in a playing interface;
  when a video picture of the target video comprises a target object and there is a text associated with the target object, displaying the text in a display region associated with a face posture of the target object in a process of playing the target video; and
  adjusting a display posture of the text with the face posture when the face posture of the target object changes in a process of displaying the text.

An embodiment of this application provides a video playing apparatus, including:

a playing module configured to play a target video in a playing interface;
a display module configured to display the text in a display region associated with the face of the target object when a video picture of the target video includes a target object and there is a text, associated with the target object, in a process of playing the target video; and
an adjusting module configured to adjust the display posture of the text with the change of the face posture when the face posture of the target object changes in a process of displaying the text.

An embodiment of this application provides a computer device, including:
  a memory, configured to store executable instructions; and
  a processor, configured to implement, when executing the executable instructions stored in the memory, the video playing method provided by the embodiment of this application.

An embodiment of this application provides a computer-readable storage medium, storing executable instructions, configured to implement, when executed by a processor, the video playing method provided by the embodiment of this application.

An embodiment of this application provides a computer program product, including a computer program or an instruction, the computer program or the instruction implementing, when executed by a processor, the video playing method provided by the embodiment of this application.

The embodiments of this application have the following beneficial effects:

According to the embodiments of this application, a target video is played in a playing interface; the text is displayed in a display region associated with the face of the target object when a video picture of the target video includes a target object and there is a text, associated with the target object, in a process of playing the target video; and the display posture of the text is adjusted with the change of the face posture when the face posture of the target object changes in a process of displaying the text. In this way, the display posture of the text may change with the change of the face posture of the associated target object, so as to realize the associated display of the text and the face of the target object, and improve the display pertinence, effectiveness and flexibility of the text.

DESCRIPTION OF EMBODIMENTS

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first\second\third" is merely intended to distinguish similar objects but does not indicate a specific order of an object. It may be understood that "first\second\third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as that usually understood by a person skilled in the art to which this application belongs. Terms used in this specification are merely intended to describe objectives of the embodiments of this application, but are not intended to limit this application.

Before the embodiments of this application are further described in detail, a description is made on nouns and terms in the embodiments of this application, and the nouns and terms in the embodiments of this application are applicable to the following explanations.

1) In response to a dependent condition or state for representing a performed operation, when the dependent condition or state is met, one or more performed operations may be real-time or may have a set delay; and unless otherwise specified, there is no restriction on the performing order of multiple performed operations.

In related technologies, when texts, such as bullet-chat screen information and caption content, are displayed, the texts are displayed in a specific region of a video picture, for example, at the top of the video picture or at the bottom of the video picture.

Figure 1:
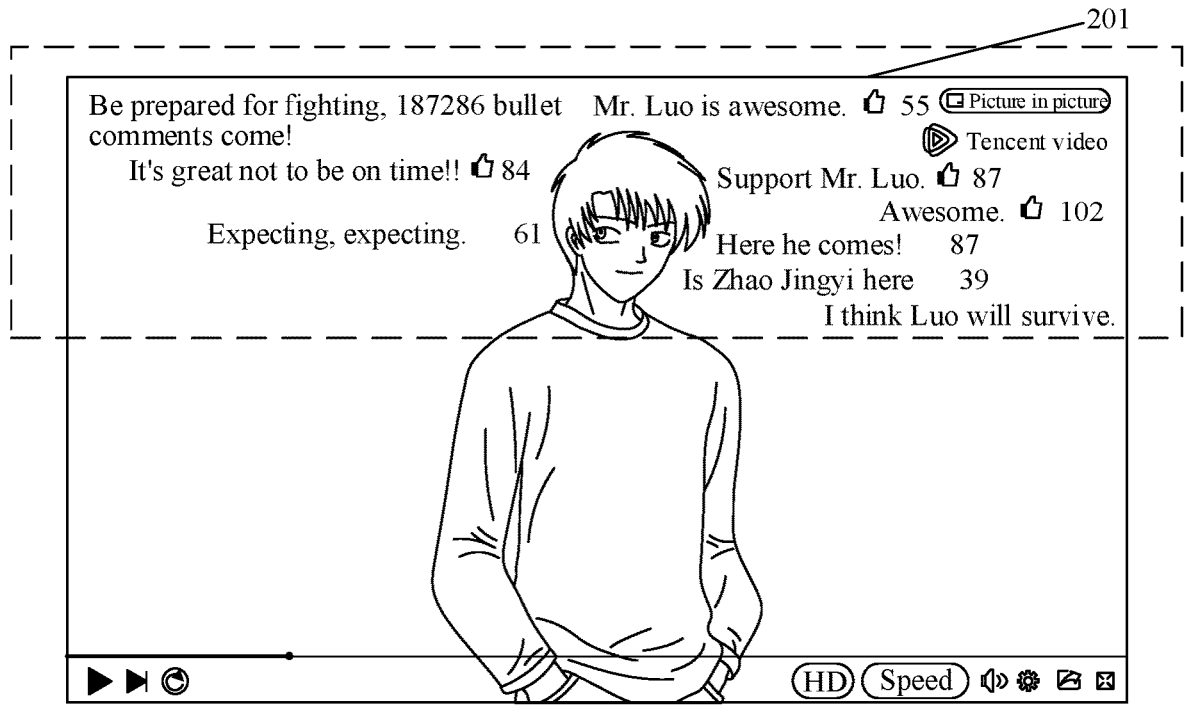
FIG. 1 is a schematic diagram of a video playing interface provided by an embodiment of this application.
Figure 2:
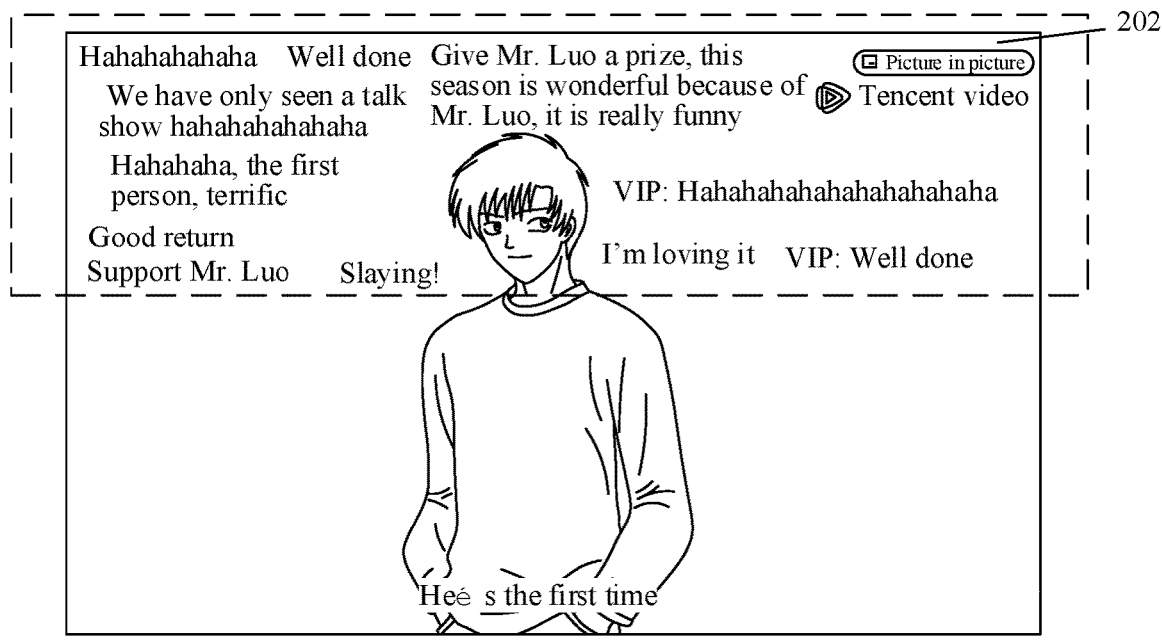
FIG. 2 is a schematic diagram of a video playing interface provided by an embodiment of this application.

FIG. 1 is a schematic diagram of a video playing interface provided by an embodiment of this application. Referring to FIG. 1, in related technologies, FIG. 1 shows floating bullet-chat screen information, that is, bullet-chat screen information 201 moves in from one side of a picture in a floating mode and moves out from the other side. FIG. 2 is a schematic diagram of a video playing interface provided by an embodiment of this application. Referring to FIG. 2, in related technologies, FIG. 2 shows intelligent matting bullet-chat screen information. When a video is played, bullet-chat screen information 202 is displayed in an intelligent matting mode, so that the bullet-chat screen information may not block the character.

When implementing the embodiments of this application, the applicant found that the object targeted by each piece of bullet-chat screen information may not be intuitively known from the floating bullet-chat screen information and the intelligent matting bullet-chat screen information, resulting in poor pertinence of the bullet-chat screen.

Based on this, the embodiments of this application provide a video playing method, apparatus and device, a computer-readable storage medium, and a computer program product, which may realize the associated display of a text and the face of a target object, so that a user may clearly know the target object associated with the text.

Figure 3:
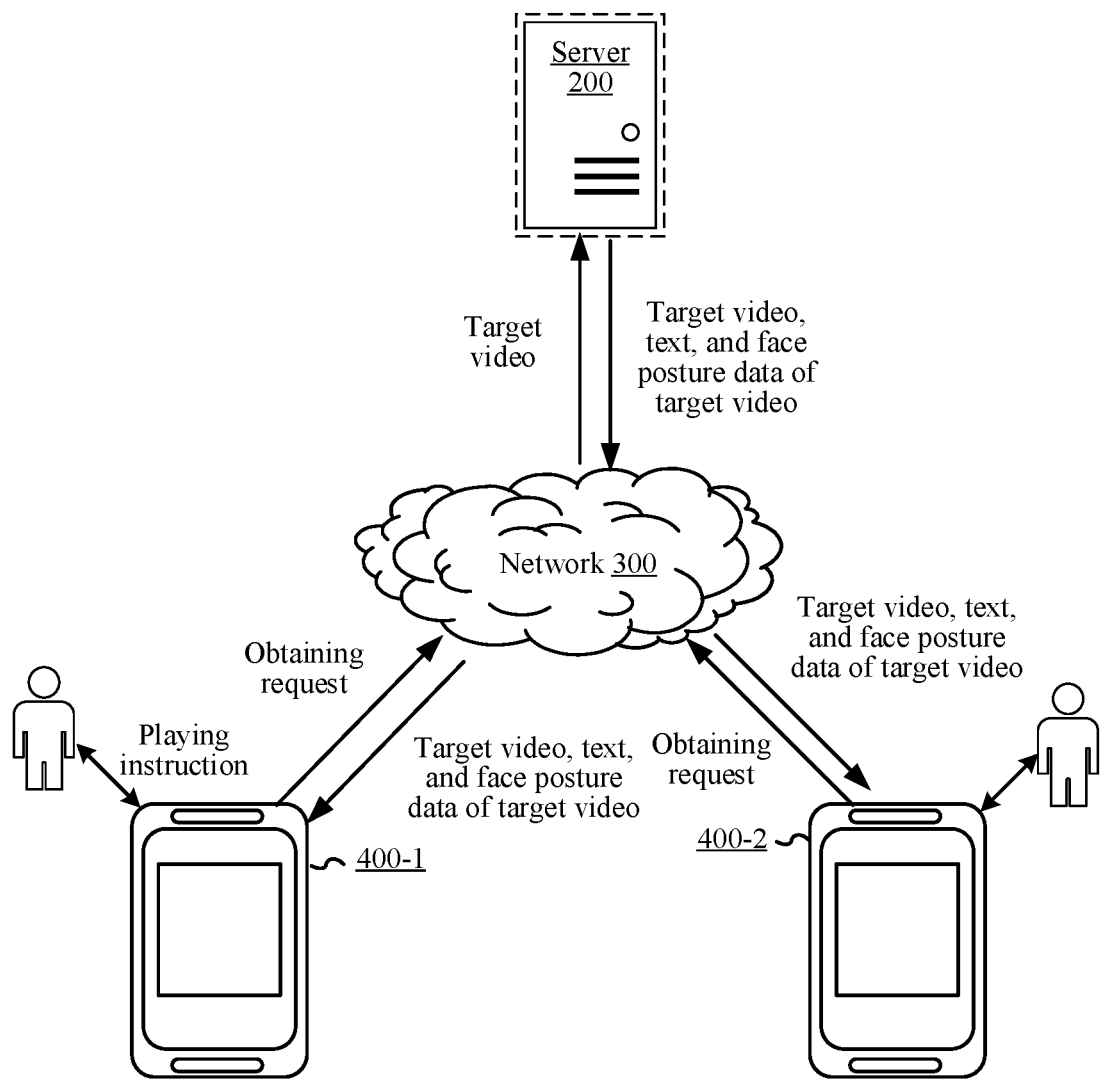
FIG. 3 is a schematic structural diagram of a video playing system 100 provided by an embodiment of this application.

Referring to FIG. 3, FIG. 3 is a schematic structural diagram of a video playing system 100 provided by an embodiment of this application. In order to support an exemplary application, terminals (a terminal 400-1 and a terminal 400-2 are exemplarily shown) are connected to a server 200 through a network 300. The network 300 may be a wide area network (WAN) or a local area network (LAN), or a combination of the two. The number of servers and the number of terminals are not limited here.

In an actual implementation, a terminal is provided with a client, such as a video client, a browser client, an information stream client, an education client, etc., for playing videos.

The terminal is configured to receive a playing instruction for a target video, and send an obtaining request for the target video, the text, and the face posture data of the target video to the server.

The server 200 obtains and sends the target video, the text, and the face posture data of the target video to the terminal in response to the obtaining request.

The terminal is configured to play the target video in a playing interface, and display the text in a display region associated with the face of the target object when a video picture of the target video includes a target object and there is a text, associated with the target object, in a process of playing the target video; and adjust the display posture of the text with the change of the face posture when determining that the face posture of the target object changes based on the face posture data of the target video in a process of displaying the text.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal may be a smartphone, a tablet computer, a notebook computer, a desktop computer, a smart speaker, a smartwatch, a TV terminal, an in-vehicle terminal and the like, but is not limited thereto. The terminal and the server may be directly or indirectly connected in a wired or wireless communication manner. This is not limited in the embodiments of this application.

Figure 4:
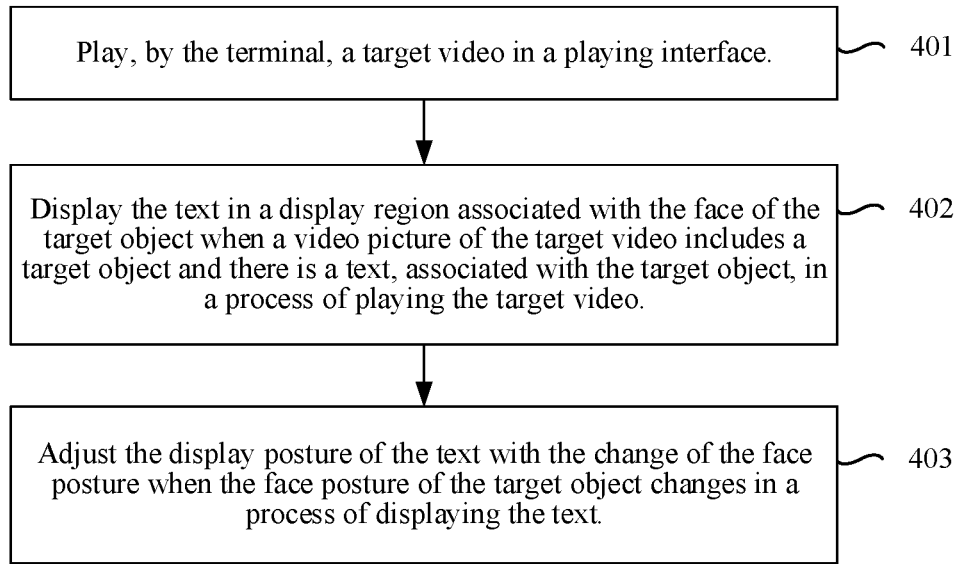
FIG. 4 is a schematic flowchart of a video playing method provided by an embodiment of this application.

Based on the above description of the information display system provided by the embodiments of this application, a video playing method provided by the embodiments of this application is described below. In some embodiments, the video playing method may be implemented by a terminal alone, or implemented by a terminal and a server cooperatively. Referring to FIG. 4, FIG. 4 is a schematic flowchart of a video playing method provided by an embodiment of this application. Taking a terminal for implementing alone as an example, the video playing method provided by the embodiment of this application includes:

Step 401: Play, by the terminal, a target video in a playing interface.

In an actual implementation, the terminal is provided with a client, a user may trigger a playing instruction for a target video through the client, and in response to the playing instruction, the terminal presents a playing interface through the client, and plays the target video in the playing interface.

Step 402: Display the text in a display region associated with the face of the target object when a video picture of the target video includes a target object and there is a text, associated with the target object, in a process of playing the target video.

In an actual implementation, the text may be a text inputted by a user, such as bullet-chat screen information inputted by the user in a process of watching a target video, or may be text information obtained by recognizing a target video, such as caption content.

The display region associated with the face of the target object changes with different positions of the face of the target object. For example, the display region associated with the face of the target object may be a region around the face of the target object, such as a head top region.

In an actual application, in a process of playing a target video, for each video frame of the target video, a terminal first judges whether the video frame includes a target object, such as performing object recognition on the video frame; if it is determined that the video frame includes the target object based on a recognition result, the terminal further judges whether there is a text, associated with the target object and a video frame corresponding to the text; and if there is a text corresponding to the video frame and the text is associated with the target object, the text is added to a display region associated with the face of the target object in the video frame, so that the added text is displayed in the display region associated with the face of the target object.

Here, the number of target objects may be one or at least two. When the number of target objects is at least two, the corresponding text is displayed in the display region associated with the face of each target object respectively.

Figure 5:
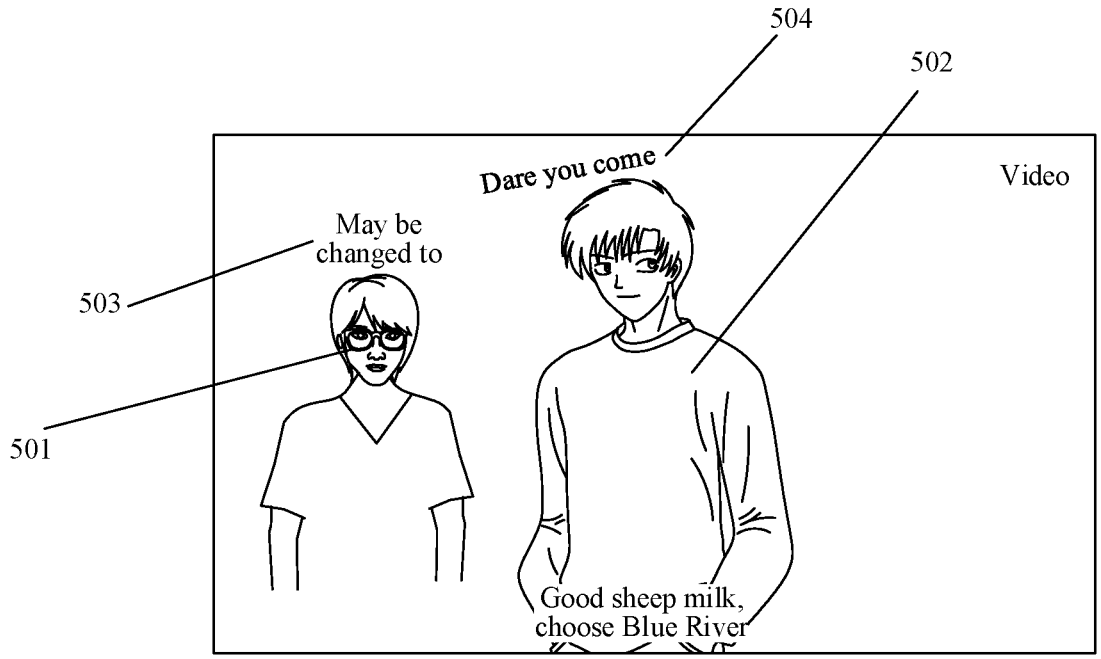
FIG. 5 is a schematic diagram of a playing interface provided by an embodiment of this application.

As an example, FIG. 5 is a schematic diagram of a playing interface provided by an embodiment of this application. Referring to FIG. 5, the number of target objects is two, namely a target object 501 and a target object 502. A text 503, associated with the target object 501, is displayed on the head top of the target object 501, and a text 504, associated with the target object 502, is displayed on the head top of the target object 502.

In some embodiments, when the text is bullet-chat screen information, the bullet-chat screen information may be the bullet-chat screen information inputted by a user of the current terminal, or the bullet-chat screen information inputted by other users. Here, when a video picture of a target video includes one object, the object in the video picture may be directly used as a target object associated with the bullet-chat screen information; and when a video picture of a target video includes at least two objects, a target object associated with the bullet-chat screen information may be selected by a user, or may be obtained by automatic matching.

In some embodiments, when the bullet-chat screen information is the bullet-chat screen information inputted by the current user, before displaying a text in a display region associated with the face of a target object, a terminal may further present object selection boxes in the video picture of the target video when a video picture of a target video includes at least two objects in response to a trigger operation on a bullet-chat screen function option in a playing interface; receive a selection operation on the target object based on the object selection boxes; present a bullet-chat screen input box corresponding to the target object in response to the selection operation; and receive bullet-chat screen information inputted based on the bullet-chat screen input box, and use the bullet-chat screen information as the text, associated with the target object.

In an actual implementation, the terminal presents the bullet-chat screen function option in the playing interface; when receiving a trigger operation on the bullet-chat screen function option, the terminal obtains the currently presented video picture, and detects objects in the video picture; when it is determined that the video picture only includes one object, the object in the video picture is used as the target object; when it is determined that the video picture includes multiple (two or more) objects, object selection boxes are presented in the picture of the target video, where the object selection boxes may be in one-to-one correspondence to the objects, and a selection operation on the target object is received by triggering the object selection box corresponding to the target object; and after the target object is determined, a bullet-chat screen input box of the target object is presented, and thus, the user may input bullet-chat screen information through the bullet-chat screen input box.

Figure 6:
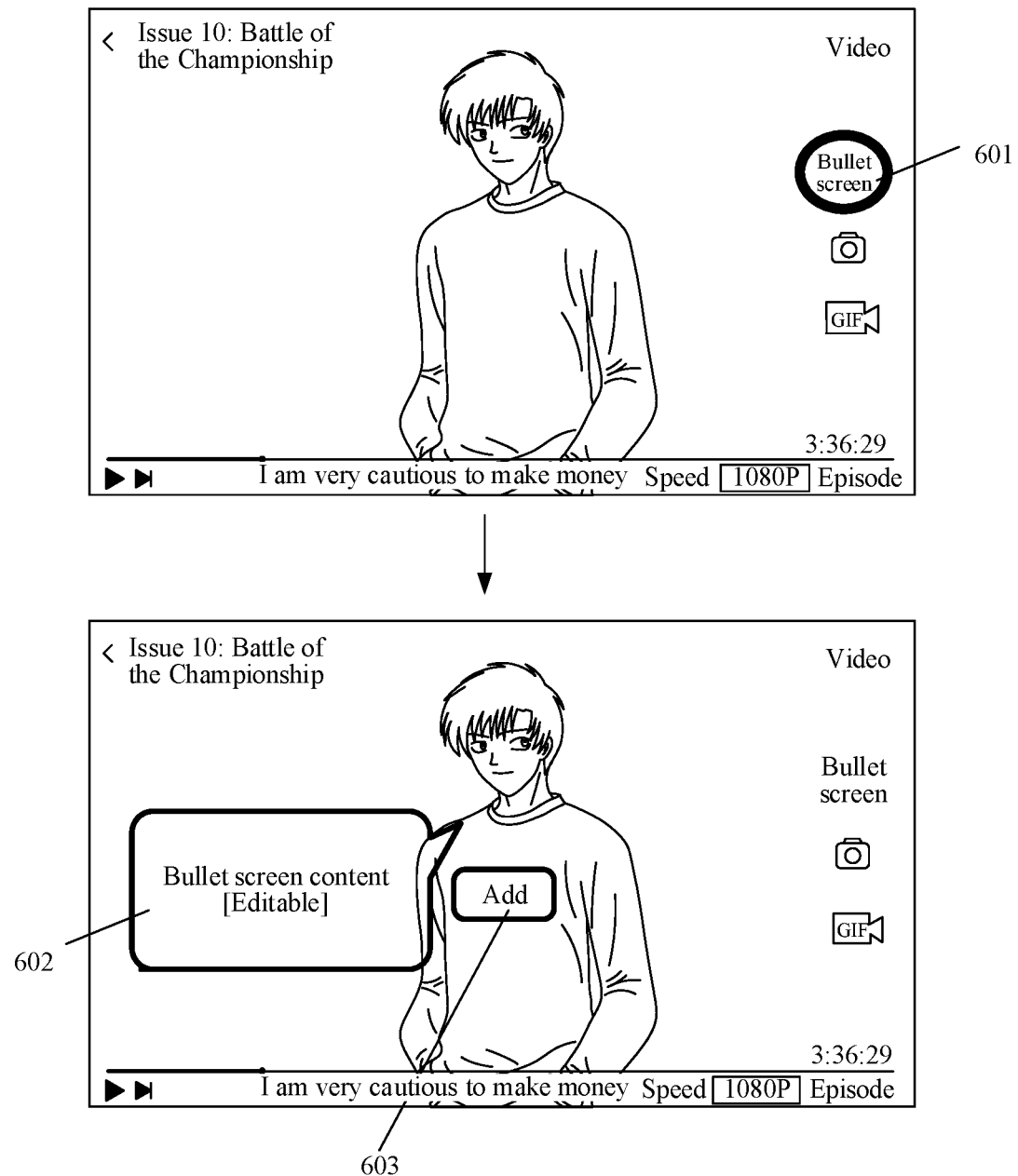
FIG. 6 is a schematic diagram of an input process of bullet-chat screen information provided by an embodiment of this application.

As an example, referring to FIG. 6, FIG. 6 is a schematic diagram of an input process of bullet-chat screen information provided by an embodiment of this application. In a process of playing a target video, a bullet-chat screen function option 601 is presented in a playing interface; when a user taps the bullet-chat screen function option 601, in response to the tap operation, if the currently presented video picture includes one object, a terminal determines the object in the currently presented video picture as a target object, and presents a bullet-chat screen input box 602 for the target object, that is, the bullet-chat screen input box is presented below a face region of the target object; the user may input bullet-chat screen information in the bullet-chat screen input box; and after the terminal receives the inputted bullet-chat screen information, that is, after the user inputs the bullet-chat screen information and taps an add function option 603, the terminal uses the bullet-chat screen information inputted by the user as a text, associated with the target object.

Tap refers to an action of clicking a mouse key at a certain position of a picture displayed in a screen, or an action of touching a screen with a finger at a certain position of a picture displayed in the screen. For example, a user tapping a bullet-chat screen function option means that the user touches a position corresponding to the bullet-chat screen function option in a screen with a finger.

Figure 7:
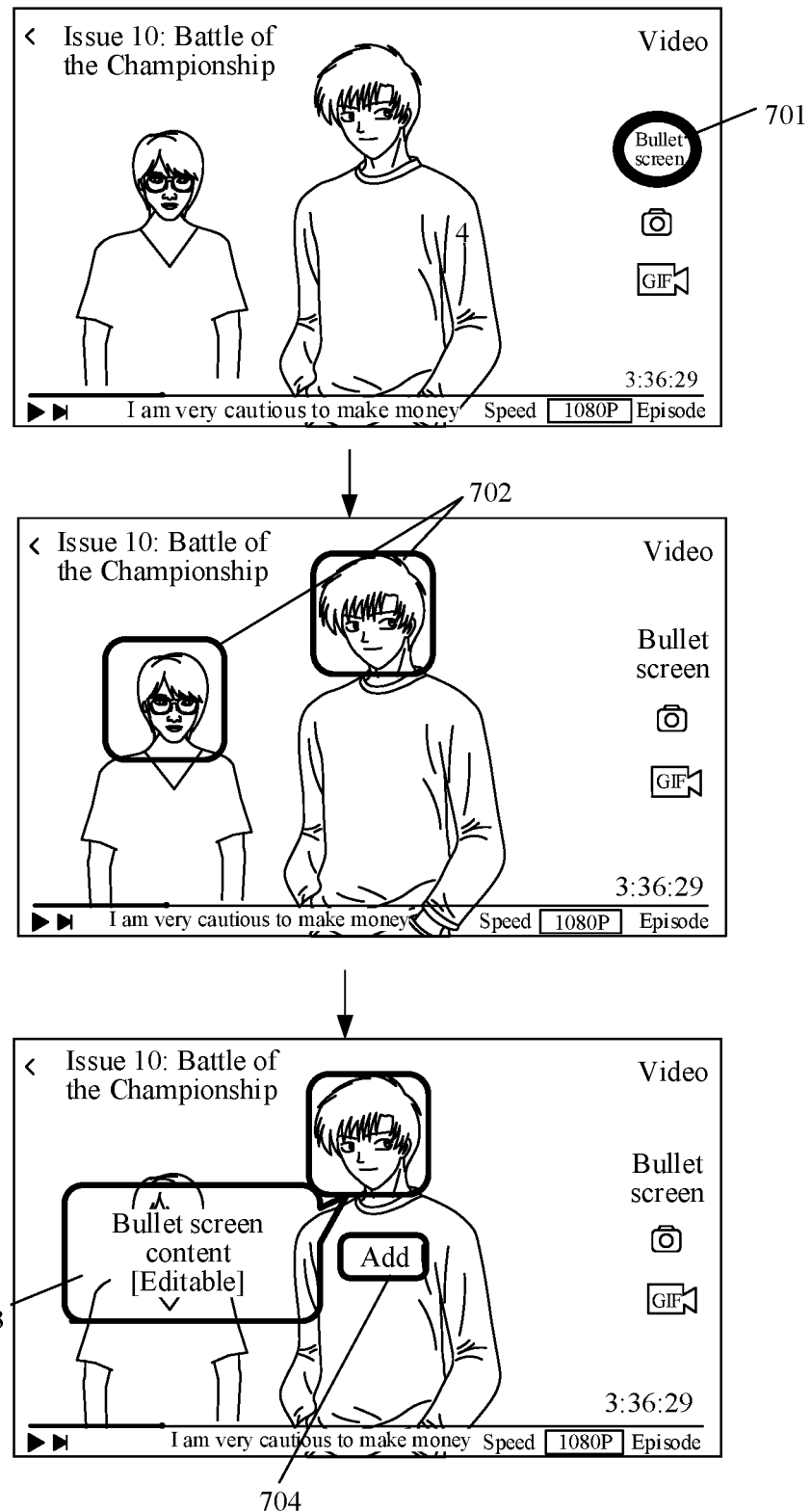
FIG. 7 is a schematic diagram of an input process of bullet-chat screen information provided by an embodiment of this application.

As an example, when a video picture includes multiple objects, FIG. 7 is a schematic diagram of an input process of bullet-chat screen information provided by an embodiment of this application, referring to FIG. 7, in a process of playing a target video, a bullet-chat screen function option 701 is presented in a playing interface; when a user taps the bullet-chat screen function option 701, an object selection box 702 is presented at a face position of each object, and the user may select a target object based on the presented object selection box, such as tapping the object selection box of the target object; after receiving a selection operation on the target object, a terminal presents a bullet-chat screen input box 703 for the target object, that is, the bullet-chat screen input box is presented below a face region of the target object; the user may input bullet-chat screen information in the bullet-chat screen input box; and after the terminal receives the inputted bullet-chat screen information, that is, after the user inputs the bullet-chat screen information and taps an add function option 704, the terminal uses the bullet-chat screen information as a text, associated with the target object.

In some embodiments, before displaying a text in a display region associated with the face of a target object, a terminal may further present a bullet-chat screen input box in a video picture of a target video in response to a trigger operation on a bullet-chat screen function option in a playing interface; receive bullet-chat screen information inputted based on the bullet-chat screen input box, and use the bullet-chat screen information as the text; match the text with each of the objects respectively when the video picture of the target video includes at least two objects, determine an object matched with the text, and use the determined matched object as the target object; and associate the bullet-chat screen information with the target object.

In an actual implementation, key information in the text may be extracted, and the key information in the text is matched with each of the objects; or the entire text may be matched with each of the objects.

As an example, a terminal may extract keywords in a text, such as character names and actor names; then match the extracted keywords with the basic information of each of the objects, where the basic information of the object includes: a name, a played character, classic lines of the object, etc.; and use the object matched with the text (for example, a matching degree reaches a matching degree threshold) as a target object.

In some embodiments, when a text is caption content, before displaying the text in a display region associated with the face of a target object, a terminal may further obtain caption information corresponding to a target video and an object in a video picture to which the caption information belongs; and use the caption content as the text, associated with the target object when the caption information includes the caption content belonging to the target object.

Here, the caption information may be a title, credits, lyrics, dialogue content, descriptions, etc. of a target video; the caption information may be uploaded by an uploader of the target video when the target video is uploaded; and when the caption information is lyrics or dialogue content, the caption information may further be obtained by recognizing the voice data of the target video. The caption content belonging to the target object may be the dialogue content and lyrics of the target object, or may be descriptions for describing the target object.

In some embodiments, a terminal may display a text based on a target color selected by a user. Before displaying a text in a display region associated with the face of a target object, a terminal may further present at least two colors in response to an editing operation on the text in a playing interface; and determine the target color as a color for displaying the text in response to a selection operation on a target color in the at least two colors. Correspondingly, the terminal may display the text by the following method: display the text by the target color.

Here, when the number of texts is at least two, the target color selected by the user may be used for all texts, or may be used for some texts, such as triggering an editing operation on a certain text to select a display color of a certain text.

In an actual implementation, at least two colors may be presented in the form of drop-down lists, icons or images. The presentation forms of the at least two colors are not limited here. In an actual application, two colors may be presented in the form of a pop-up window directly in a playing interface; or an independent floating layer or sub-interface above a playing interface may be presented first, and then, at least two colors are presented in the floating layer or sub-interface.

Figure 8:
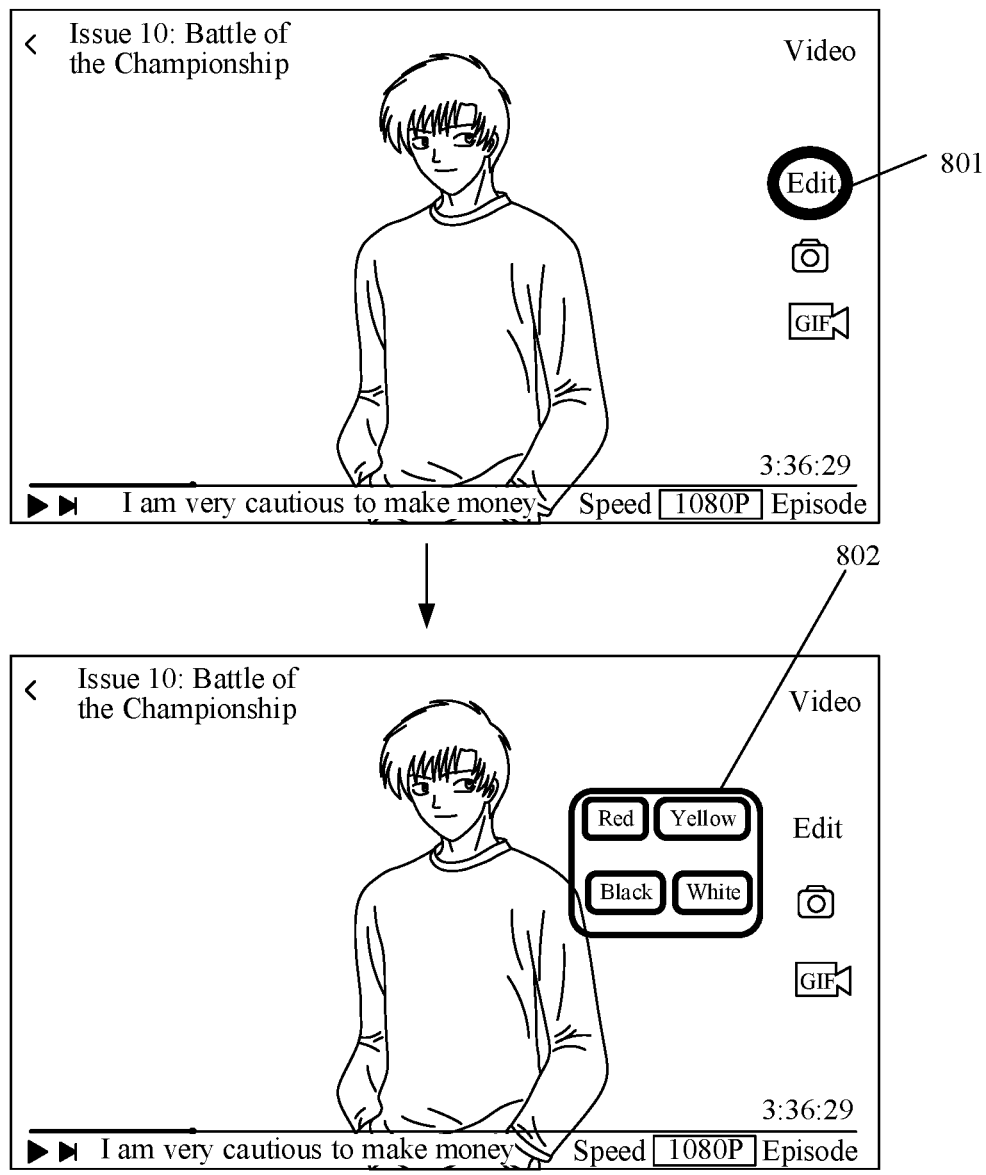
FIG. 8 is a schematic diagram of a playing interface provided by an embodiment of this application.

For example, referring to FIG. 8, FIG. 8 is a schematic diagram of a playing interface provided by an embodiment of this application. An edit function option 801 for a text is displayed in the playing interface. When a user taps the edit function option 801, a terminal presents multiple colors 802 to be selected, where the colors are presented in the form of icons. When the user taps a target color to trigger a selection operation on the target color, the target color indicated by the selection operation is determined as the color for displaying the text by the user. In this way, when the text is displayed, the user may adaptively select different colors for displaying, thereby enriching the display style of the text.

In some embodiments, if a text is bullet-chat screen information, when a publisher of the bullet-chat screen information edits the bullet-chat screen information, the color of the bullet-chat screen information is selected; and when the text is displayed, the text is displayed by the target color selected by the publisher.

In some embodiments, a terminal may display a text in a display region associated with the face of a target object by the following method: display the text by a display color matched with a video picture of a target video.

In an actual implementation, the terminal may obtain a color in the video picture, such as a background color and a clothing color of the target object, and then determine a color matched with the obtained color in the video picture. When the obtained color is the background color, a color matched with the background color may be determined to highlight the text, for example, if the background color is a black color, a white color is used as a display color matched with the video picture of the target video; and when the obtained color is the clothing color of the target object, a color with the same color system as the clothing color may be used as a display color, so that the text may be integrated with the target object.

In some embodiments, a terminal may further identify a display region associated with the face of a target object in response to a first position adjusting instruction for a text; and control the text to move in the display region associated with the target object in response to a drag operation on the text, so as to adjust a display position of the text in the display region.

In an actual implementation, when the text is displayed, the display position of the text may be adjusted, where the display position of any text may be adjusted; and if the text is bullet-chat screen information, when a user publishes the bullet-chat screen information, the display position of the text may be adjusted.

In an actual application, when the user triggers the first position adjusting instruction for the text, after receiving the first position adjusting instruction, in response to the first position adjusting instruction, the terminal identifies a display region associated with the face of the target object, such as identifying a display region associated with the target object through a dashed box, where the text may be located at any position in the display region, but may not be moved out of the display region.

Figure 9:
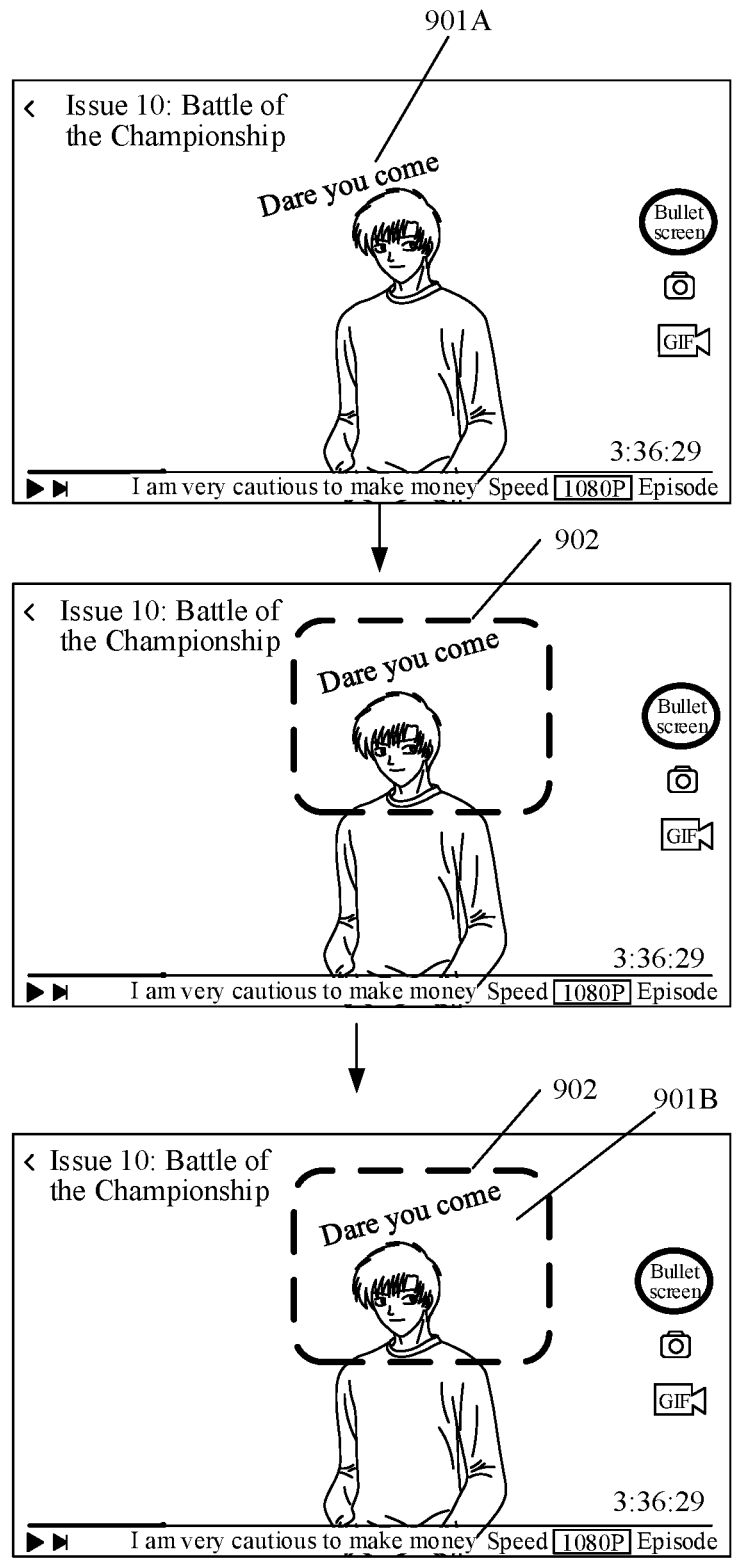
FIG. 9 is a schematic diagram of a playing interface provided by an embodiment of this application.

As an example, referring to FIG. 9, FIG. 9 is a schematic diagram of a playing interface provided by an embodiment of this application. A text is displayed at a position shown by 901A in a display region associated with the face of a target object in a video picture of a target video; when a user long-presses the text, a first position adjusting instruction for the text is triggered, and the display region is identified by a dashed box 902; and in response to a drag operation on the text, the text is controlled to move in the dashed box 902, such as moving to a position shown by 901B in the display region 902.

In some embodiments, when there are at least two display regions associated with the face of a target object, a terminal may further identify the at least two display regions in response to a second position adjusting instruction for a text; and use the display region corresponding to the selection operation as the display region corresponding to the text in response to a selection operation triggered based on the at least two display regions.

In an actual implementation, when a user triggers the second position adjusting instruction for the text, after receiving the second position adjusting instruction, in response to the second position adjusting instruction, the terminal identifies at least two display regions associated with the face of the target object, such as identifying a display region associated with the target object through a dashed box, where the text may be located in any display region.

Figure 10:
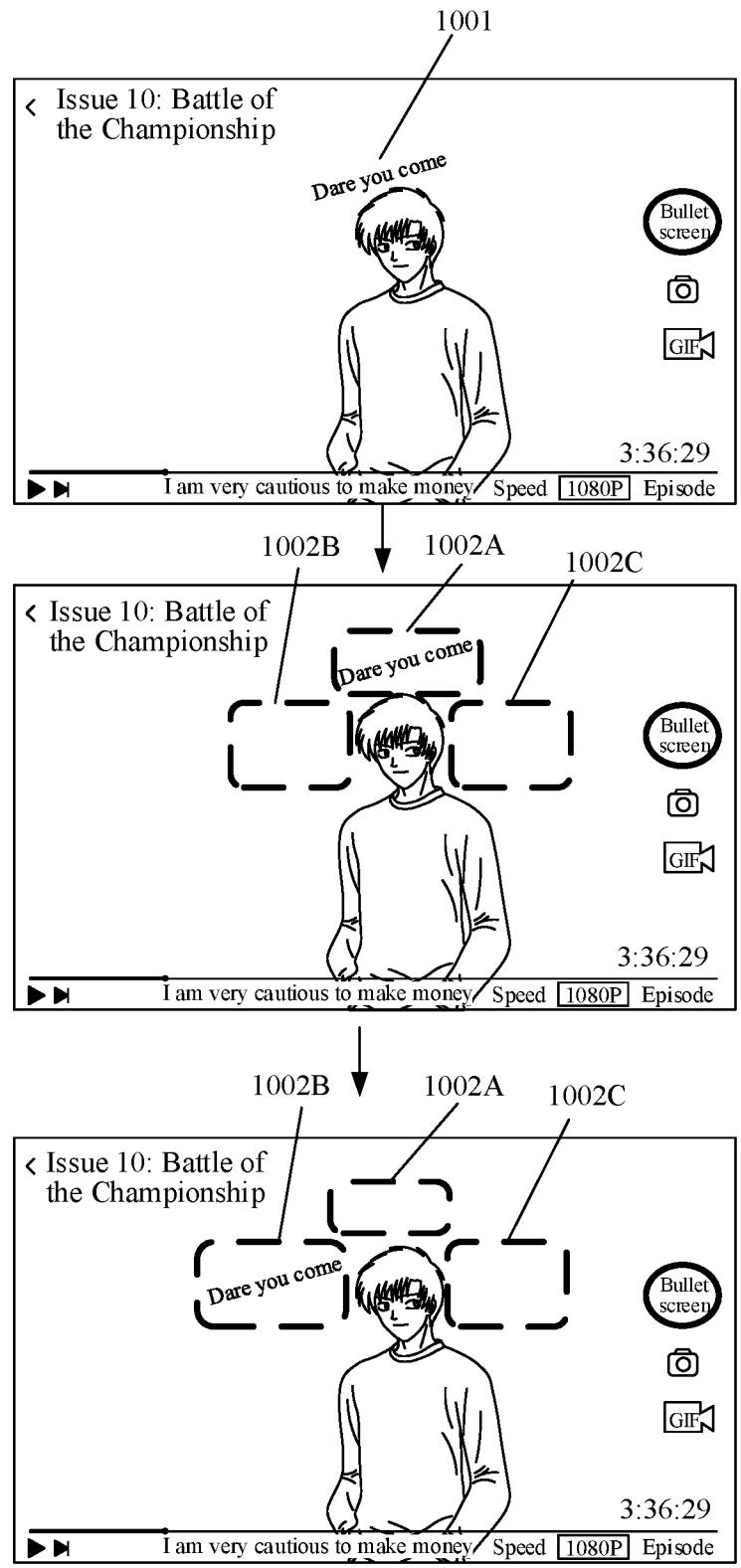
FIG. 10 is a schematic diagram of a playing interface provided by an embodiment of this application.

As an example, referring to FIG. 10, FIG. 10 is a schematic diagram of a playing interface provided by an embodiment of this application. A text 1001 is displayed in a display region associated with the face of a target object in a video picture of a target video; when a user long presses the text 1001, a second position adjusting instruction for the text is triggered, and a terminal identifies three display regions through dashed boxes 1002A, 1002B and 1002C; and in response to a selection operation on a certain display region, such as tapping the dashed box 1002B, the display region identified by the dashed box 1002B is used as the display region of the text 1001, and the text 1001 is moved into the dashed box 1002B for displaying.

In some embodiments, a terminal may display a text in a display region associated with the face of a target object by the following method: determine a display region matched with the text content in the at least two display regions based on the text content of the text when there are at least two display regions associated with the face of the target object; and display the text in the display region matched with the text content.

In an actual implementation, when there are multiple display regions associated with the face of the target object, a display region may be selected based on the text content of the text. Here, keywords, such as keywords associated with facial features, may be extracted from the text content so as to match a display region based on the keywords.

For example, assuming that a display region associated with the face of the target object includes a head top region, a face left region and a face right region, when the text content of the text is associated with the hairstyle, the text is displayed in the head top region.

In some embodiments, a terminal may display a text in a display region associated with the face of a target object by the following method: play the at least two texts in sequence in a display region associated with the face of the target object when there are at least two texts, associated with the target object.

In an actual implementation, when there are multiple (two or more) texts, associated with the target object, a display duration of each text may be determined; and when the display duration of a text is reached, the next text is displayed so as to play the multiple texts in sequence.

Here, the display duration of each text may be set manually, for example, when the text is bullet-chat screen information, the display duration of each text may be set to 5 seconds; and the display duration of each text may also be determined according to a target video, for example, when the text is caption content, a voice playing duration corresponding to the caption content may be used as a playing duration of the caption content. The display durations of the texts may be the same or different.

Figure 11:
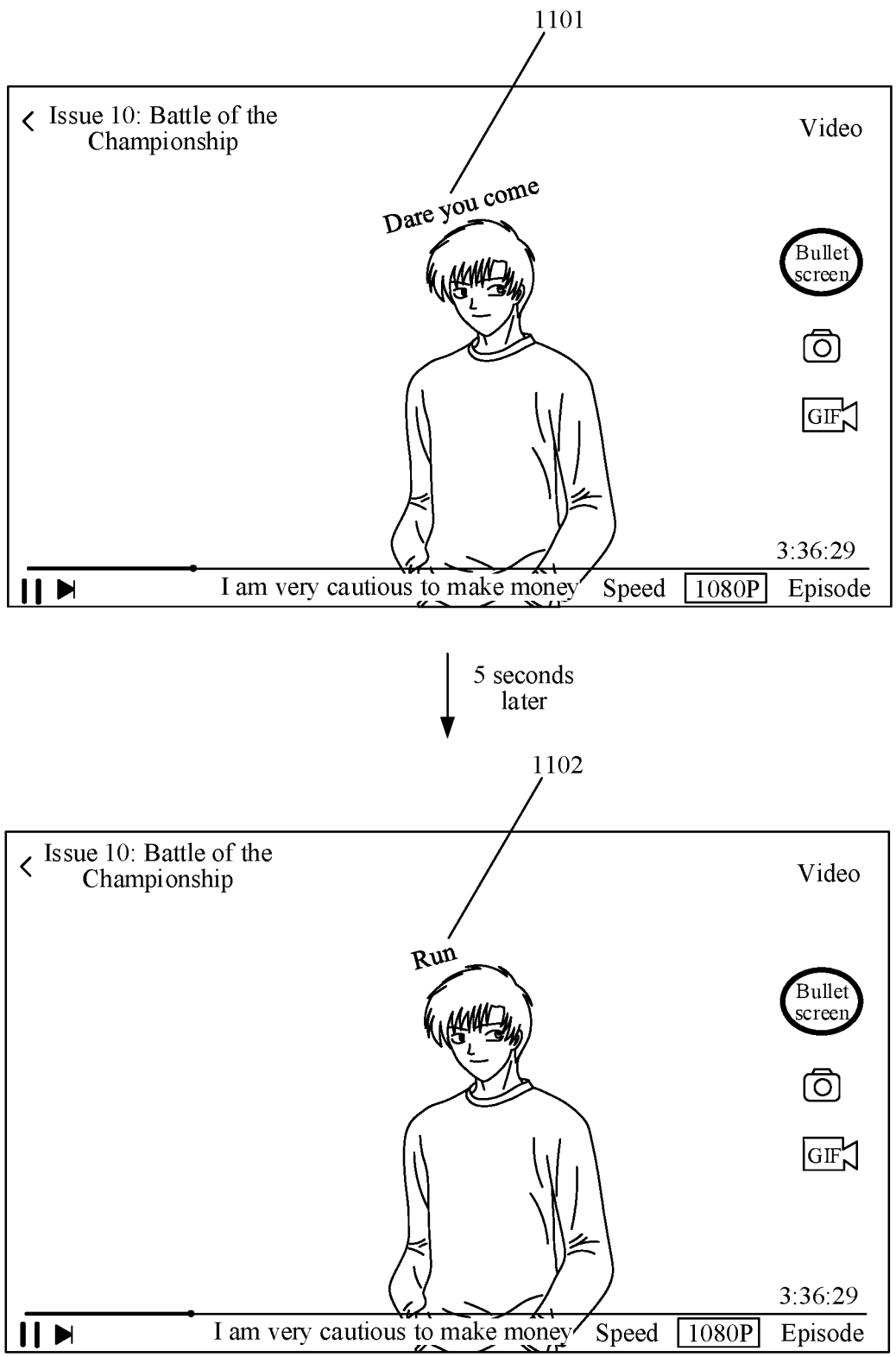
FIG. 11 is a schematic diagram of a playing interface provided by an embodiment of this application.

As an example, referring to FIG. 11, FIG. 11 is a schematic diagram of a playing interface provided by an embodiment of this application. Assuming that the display duration of each text is set to 5 seconds, a text 1101 is displayed in a display region associated with the face of a target object; and when the display duration of the text 1101 reaches 5 seconds, the display of the text 1101 is cancelled, and a text 1102 is displayed.

In some embodiments, a terminal may display a text in a display region associated with the face of a target object by the following method: respectively determine a display region corresponding to each text when there are multiple texts, associated with the target object, where the texts are in one-to-one correspondence to the display regions; and display the corresponding text respectively through each of the display regions.

Here, the display region corresponding to each text may be preset or randomly assigned. In an actual implementation, the texts are in one-to-one correspondence to the display regions, that is, the number of the texts is the same as the number of the display regions, therefore, multiple texts may be displayed at the same time.

Figure 12:
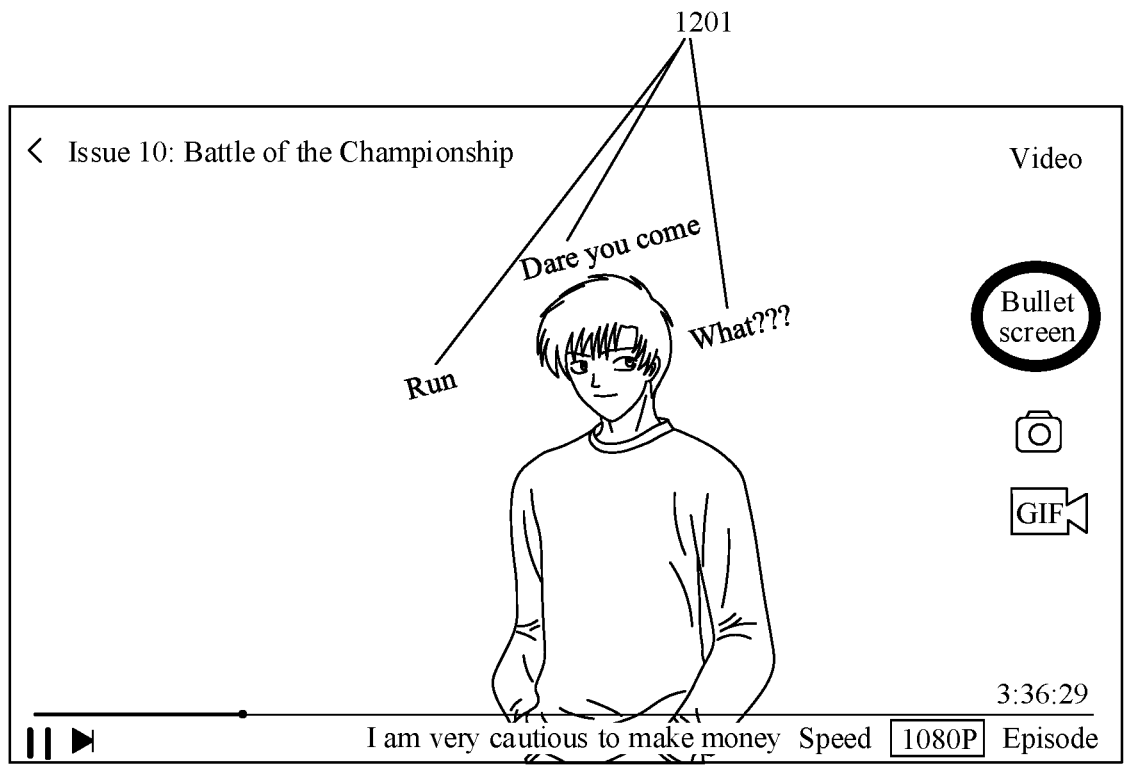
FIG. 12 is a schematic diagram of a playing interface provided by an embodiment of this application.

As an example, referring to FIG. 12, FIG. 12 is a schematic diagram of a playing interface provided by an embodiment of this application. There are three texts 1201, associated with a target object, and the corresponding text 1201 is displayed through three display regions associated with the face of the target object.

In some embodiments, a terminal may obtain a size of a face region of a target object; and determine a display region associated with the face of the target object based on the size of the face region, so as to enable the size of the display region to be matched with the size of the face region.

In an actual implementation, the terminal may determine the size of the display region associated with the face of the target object according to the size of the face region of the target object, so that the size of the display region may be dynamically adjusted according to the size of the face region of the target object.

Figure 13A:
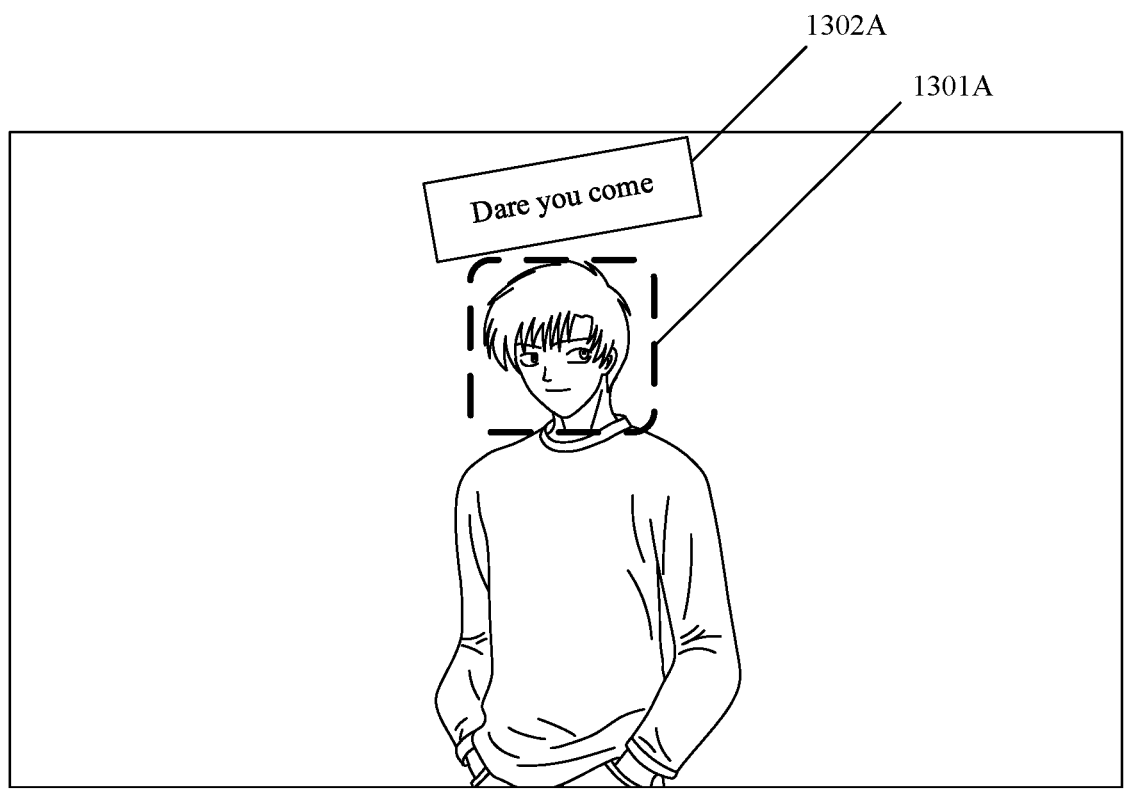
FIG. 13A and FIG. 13B are schematic diagrams of playing interfaces provided by an embodiment of this application.
Figure 13B:
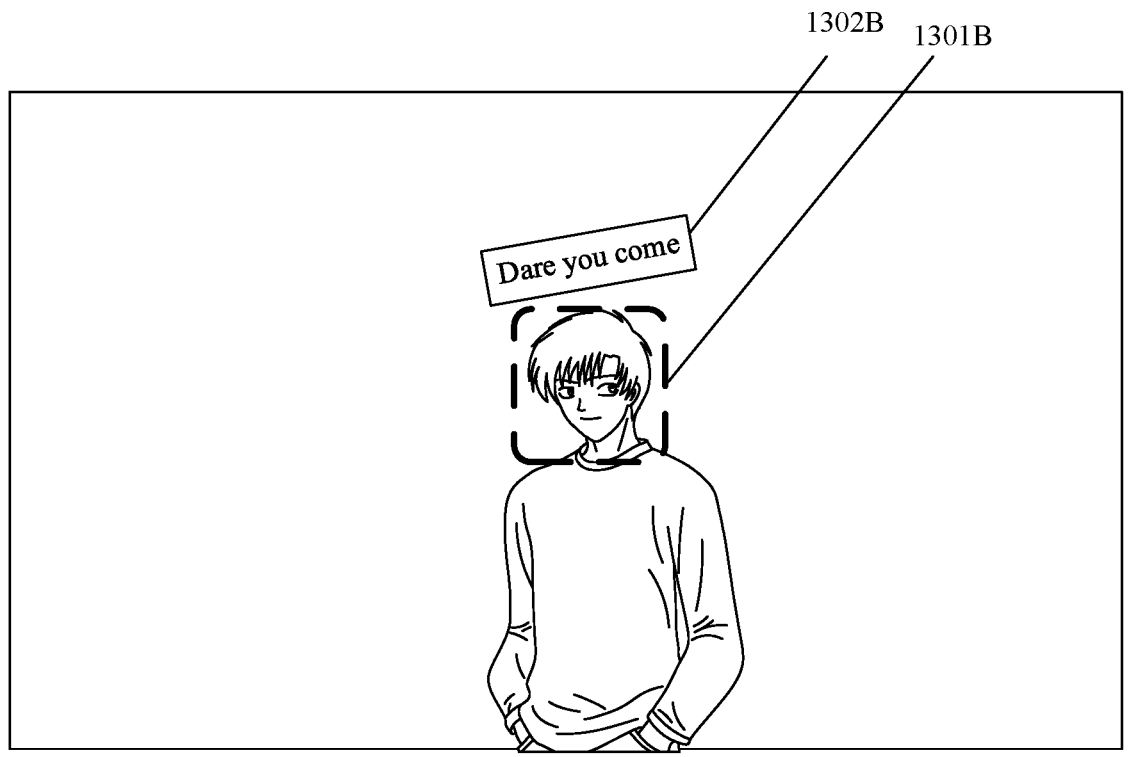

For example, the size of the face region may be directly proportional to the size of the display region, that is, the larger the size of the face region, the larger the size of the display region. Referring to FIG. 13A and FIG. 13B, FIG. 13A and FIG. 13B are schematic diagrams of playing interfaces provided by an embodiment of this application. The size of a face region 1301A in FIG. 13A is larger than the size of a face region 1301B in FIG. 13B, and correspondingly, the size of a display region 1302A in FIG. 13A is larger than the size of a display region 1302B in FIG. 13B.

In an actual application, while determining the size of a display region associated with the face of a target object according to the size of a face region, the word size of a text may be dynamically adjusted according to the size of the display region. For example, the word size may be determined according to the size of the display region, so as to enable the text to just fill the display region.

In some embodiments, if a text is bullet-chat screen information, a terminal may display the text by the following method: determine a user level of the user corresponding to each piece of bullet-chat screen information when there are at least two pieces of bullet-chat screen information and the at least two pieces of bullet-chat screen information correspond to at least two users; and display the bullet-chat screen information based on the user level.

In an actual implementation, the corresponding bullet-chat screen information may be sorted according to the user level of the user corresponding to the bullet-chat screen information in a descending order to obtain a bullet-chat screen information sequence, and then, the bullet-chat screen information is displayed according to the obtained bullet-chat screen information sequence.

As an example, according to the bullet-chat screen information sequence, a target number of bullet-chat screen information is selected in a descending order of the user level for displaying, where the target number may be one or at least two; or, according to the bullet-chat screen information sequence, the bullet-chat screen information of which the user level reaches a target user level is displayed in a descending order of the user level.

Step 403: Adjust the display posture of the text with the change of the face posture when the face posture of the target object changes in a process of displaying the text.

Here, the face posture refers to the angle information of the orientation of the face, and the display posture refers to the angle information of the orientation of the text. In some embodiments, the angle information may be represented by Euler angles, including a pitch angle, a yaw angle and a roll angle, where the pitch angle indicates that an object rotates around an x axis; the yaw angle indicates that the object rotates around a y axis; and the roll angle indicates that the object rotates around a z axis.

In some embodiments, when the face posture of a target object changes, the display posture of a text may be synchronously adjusted with the change of the face posture. Correspondingly, a terminal may adjust the display posture of the text by the following method: determine that the face posture of the target object changes when the face of the target object rotates; and control the text to rotate synchronously with the face of the target object with the change of the face posture according to a rotation direction and a rotation angle of the face of the target object, so as to adjust the display posture of the text.

In an actual implementation, since the face posture refers to the angle information of the orientation of the face, the rotation direction and the rotation angle of the text may be consistent with the rotation direction and the rotation angle of the face of the target object. For example, if the face of the target object is rotated 30 degrees to the left, the text is controlled to be rotated 30 degrees to the left.

Here, the rotation direction and the rotation angle refer to a rotation direction and a rotation angle relative to a camera.

Figure 14A:
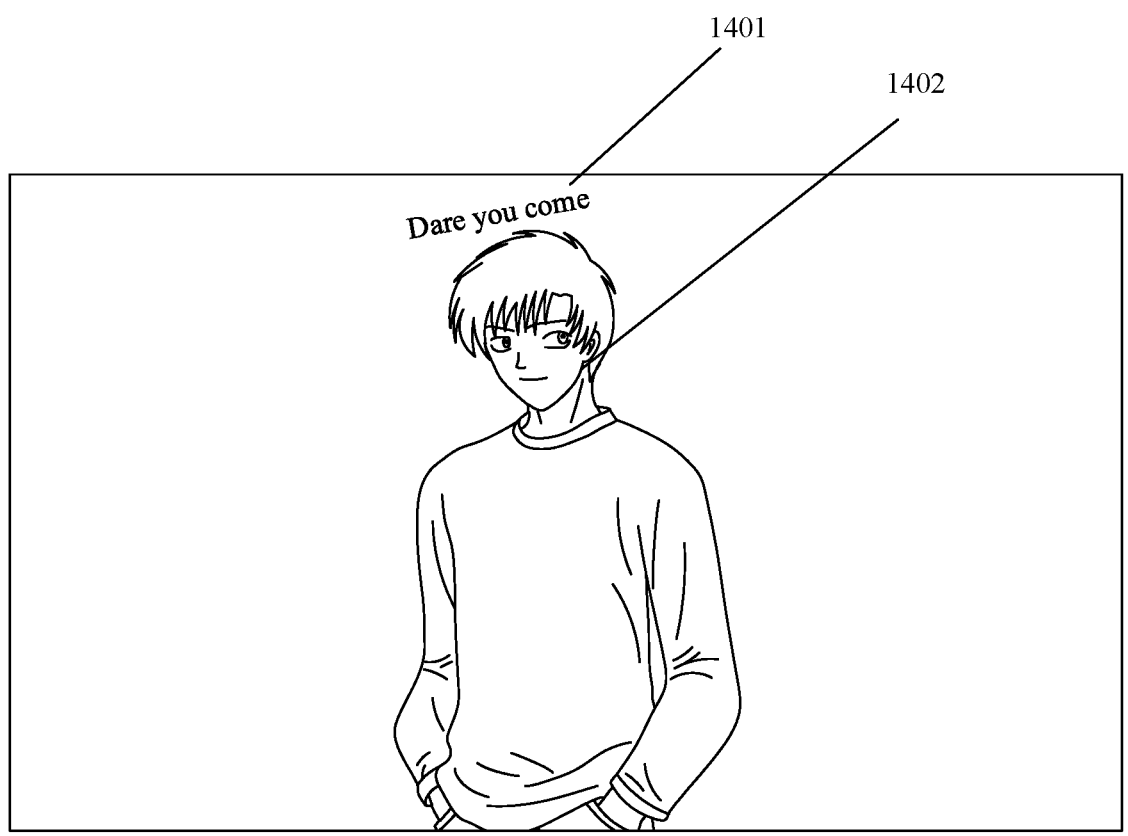
FIG. 14A and FIG. 14B are schematic diagrams of playing interfaces provided by an embodiment of this application.
Figure 14B:
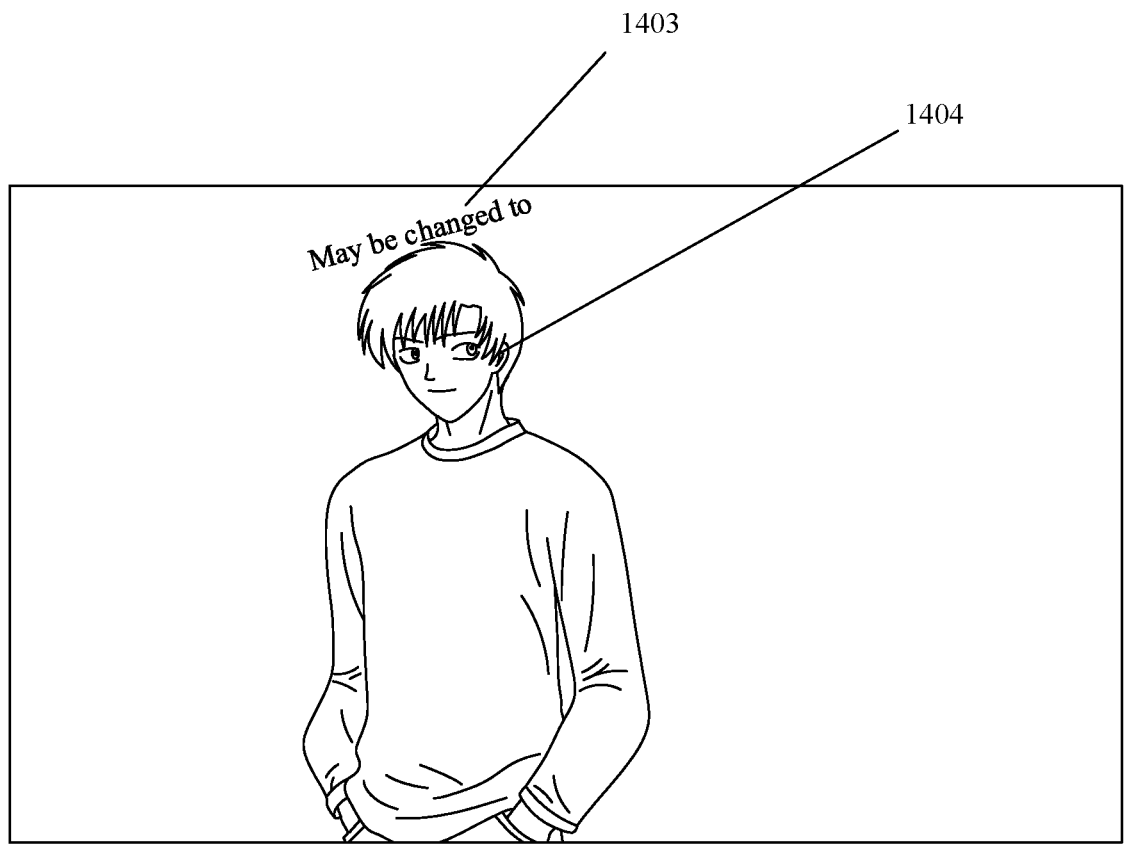

Referring to FIG. 14A and FIG. 14B, FIG. 14A and FIG. 14B are schematic diagrams of playing interfaces provided by an embodiment of this application. In FIG. 14A, the display posture of a text 1401 is consistent with the face posture of a target object 1402, and both are rotated to the left; in FIG. 14B, the display posture of a text 1403 is consistent with the face posture of a target object 1404, and both are rotated to the left; and furthermore, since the face of the target object 1404 is rotated to the left by a larger angle relative to the face of the target object 1402, correspondingly, the text 1403 is rotated to the left by a larger angle relative to the text 1401.

In some embodiments, a terminal may adjust the display posture of a text with the change of the face posture by the following method: first, draw, by the terminal, a text picture according to the text; then, obtain the face posture of a target object in each video frame displaying the text, and perform affine transformation on the text picture according to the face posture of the target object to obtain a transformed text picture, so as to enable the display posture of the text corresponding to the transformed text picture to be consistent with the face posture; and superimpose the transformed text picture to a display region associated with the face of the target object in the corresponding video frame, so as to display the text in the display region associated with the face of the target object. In some embodiments, when a terminal draws a text picture, word wrap is optional, that is, after a character size reaches a given threshold, a new line symbol is automatically added, the word has a transparent channel, and a non-word region is transparent.

In some embodiments, a terminal may determine the display posture of a target object in a target video by the following method: detect the face in each video frame in the target video through a face detection algorithm; recognize the face in each video frame again to obtain a face trajectory of the target object; detect face feature points of the target object based on the face trajectory; and perform face posture estimation based on the face feature points to obtain the face posture of the target object as the display posture of the target object.

Here, a process of determining the display posture of the target object in the target video may be performed by a terminal, or may be performed by a server. When the process of determining the display posture of the target object in the target video is performed by the server, the computational complexity of the terminal may be reduced, and low power consumption may be guaranteed, thereby being suitable for various terminals.

In an actual application, first, for each video frame, face detection may be performed on the video frame through a face detection algorithm, such as a multi-task convolutional neural network (MTCNN), so as to detect all faces in the video frame. Then, based on the detected faces, a face region image corresponding to each video frame is intercepted, each face region image is recognized again to obtain an object corresponding to each face region image, and according to the positions of the same object in consecutive video frames, a face trajectory of the same object is obtained, so that a face trajectory of the target object may be determined according to the position of the face region image corresponding to the target object in the corresponding video frame. Subsequently, according to the face trajectory of the target object, feature point detection is performed on the face region image corresponding to the target object to obtain the positions of face feature points in the face region image, and then, the coordinates of the face feature points in the face region image are transformed to the corresponding video frame to obtain the coordinates of the face feature points in the video frame image, so that the face feature points are represented by the coordinates of the face feature points in the video frame image. Finally, face posture estimation is performed based on the face feature points to obtain the face posture of the target object, and according to the face trajectory of the target object, the face posture of the target object is filtered to obtain a face posture without jittering. Here, the face trajectory of the target object may have multiple sections, and the face posture corresponding to each section of the face trajectory is filtered respectively to filter out jittering, so as to obtain a face posture without jittering.

In some embodiments, for each video frame including a target object, a terminal may perform face posture estimation based on face feature points by the following method: obtain an internal parameter of a camera; select multiple face feature points for face posture estimation; establish a head coordinate system in a shot physical three-dimensional environment, and set the coordinates of the selected face feature points in the head coordinate system; and estimate the face posture based on the coordinates of the selected face feature points in the head coordinate system, the coordinates of the face feature points in the video frame and the internal parameter of the camera. Here, the face posture is represented by the coordinates of the face of the target object in a camera coordinate system (translation vector relative to the camera) and three rotation angles (pitch angle, yaw angle and roll angle).

In an actual implementation, the internal parameter of the camera is a focal length of a lens. If the focal length of the lens is unknown, a preset value (the same as the height of an image) may be set manually, or the video frame may be automatically detected by an algorithm to obtain the internal parameter of the camera. Here, the obtaining method of the internal parameter of the camera is not limited.

Taking six selected face feature points, namely the left corner of the left eye, the right corner of the right eye, the left corner of the mouth, the right corner of the mouth, the tip of the nose and the chin as an example, a process of face posture estimation is described. A head coordinate system is established in a shot physical three-dimensional environment, and the head coordinate system sets the coordinates of six face feature points in a face coordinate system by default, such as the tip of the nose (0.0, 0.0, 0.0), the chin (0.0, −330.0, −65.0), the left corner of the left eye (−225.0, 170.0, −135.0), the right corner of the right eye (225.0, 170.0, −135.0), the left corner of the mouth (−150.0, −150.0, −125.0), and the right corner of the mouth (150.0, −150.0, −125.0); and then, the coordinates of the six face feature points in the face coordinate system (coordinates of three-dimensional feature points), the coordinates of the face feature points in the video frame (coordinates of two-dimensional feature points), and the focal length of the lens are substituted into a Perspective-N-Point (PNP) algorithm, so as to compute the face posture.

In some embodiments, each section of the face trajectory of a target object may be processed as follows: If the face of the target object is not detected in M video frames, but the face of the target object is detected in two video frames before and after the M video frames, and in the two video frames before and after the M video frames, the distance between the positions of the face region images corresponding to the target object is less than a preset threshold, it means that in the two video frames before and after the M video frames, the distance between the positions of the face region images corresponding to the target object is close enough, and it is necessary to use an interpolation method to supplement the face data of an intermediate frame (including the position of the face region image and the face posture), where M is a natural number, for example, M may be 2.

If the face of the target object is not detected in M video frames, but the face of the target object is detected in two video frames before and after the M video frames, and in the two video frames before and after the M video frames, the distance between the positions of the face region images corresponding to the target object reaches a preset threshold, it means that in the two video frames before and after the M video frames, the distance between the positions of the face region images corresponding to the target object is not close enough, then, it is considered that the video picture is switched, and the face trajectory is divided into two sections according to the switching time.

If a target object is detected in a video frame, but the positions of the face region images corresponding to the target object in the two video frames before and after the video frame jump (in two adjacent video frames, the distance between the positions of the face region images corresponding to the target object exceeds a distance threshold, such as 5% of an image height), it is considered that the face detection of the video frame fails, and correct face data in the video frame is obtained by an interpolation method through the face data in the two video frames before and after the video frame.

If there is no face of the target object in N consecutive video frames, it is considered that the video picture is switched, and the face trajectory is divided into two sections according to the switching time, where N is a positive integer, and N is greater than M, for example, M is 2 and N is 3.

In some embodiments, a terminal may filter the face posture corresponding to each section of the face trajectory respectively by the following method: for each section of the face trajectory, obtain a face posture sequence corresponding to the face trajectory, where the face posture in the face posture sequence includes six dimensions of data; and filter each dimension of data in the face posture sequence respectively to filter out jittering, so as to obtain a face posture without jittering.

In an actual application, extended Kalman filtering may be used for filtering each dimension of data. For example, a value of a start time point of the face trajectory is used as an initial value of the extended Kalman filtering to ensure that filtering results are normally available at the start time of each section of the trajectory.

After the face posture without jittering is obtained, according to the order of video frames, the information, such as the face position, face posture, face ID (identification object), serial number of the video frame, video ID and focal length of the lens, detected in each video frame are stored in a face posture database for subsequent use.

In some embodiments, a terminal may perform affine transformation on a text picture according to the face posture of a target object by the following method: determine the coordinates of at least two vertices of the text picture in a head coordinate system; project the coordinates of the at least two vertices of the text picture in the head coordinate system to an imaging plane of a camera based on the face posture of the target object, so as to obtain the coordinates of the at least two vertices of the text picture in a video frame; compute a transformation matrix that transforms the text picture to the imaging plane of the camera based on the coordinates of the at least two vertices of the text picture in the head coordinate system and the coordinates of the at least two vertices of the text picture in the video frame; perform affine transformation on the text picture by a perspective transformation matrix to obtain a transformed text picture; and superimpose the transformed text picture to the video frame to obtain a video frame to which a text is added.

In some embodiments, the coordinates of a text picture in a head coordinate system may be determined by the following method: obtain the length and width of the text picture, and determine the position relationship between a display region of the text picture and the face of a target object; and determine the coordinates of the text picture in the head coordinate system based on the length and width of the text picture and the position relationship between the display region of the text picture and the face of the target object.

Taking a mode of displaying a text picture on the head top of a target object as an example, when the text picture is a rectangle, the length of the text picture is w, the width of the text picture is H, and the height from the text picture to the nose of the target object is D, the coordinates of four vertices of the text picture in a head coordinate system are determined as: upper left corner (−W/2, −D−H, 0), lower left corner (−W/2, −D, 0), lower right corner (W/2, −D, 0), and upper right corner (W/2, −D−H, 0).

In some embodiments, the coordinates of at least two vertices of a text picture in a head coordinate system may be projected to an imaging plane of a camera by the following method: compute the three-dimensional coordinates of the at least two vertices of the text picture in a camera coordinate system based on the face posture of a target object; project the three-dimensional coordinates of the at least two vertices of the text picture in the camera coordinate system to an imaging plane of a camera by means of point cloud projection, so as to obtain the coordinates of the at least two vertices of the text picture in a video frame; obtain original two-dimensional coordinates of the at least two vertices of the text picture; determine a transformation matrix that transforms the text picture to the imaging plane of the camera based on the mapping relationship between the original two-dimensional coordinates of the at least two vertices of the text picture and the coordinates of the at least two vertices of the text picture in the video frame; and perform affine transformation on the text picture according to the transformation matrix to obtain a transformed text picture.

Here, display parameters of the text picture need to be consistent with the face posture. Based on this, according to the face posture of the target object and the coordinates of the at least two vertices of the text picture in the head coordinate system, the three-dimensional coordinates of the at least two vertices of the text picture in the camera coordinate system may be determined by a computing mode of solid geometry; and the obtained three-dimensional coordinates of the at least two vertices of the text picture in the camera coordinate system are projected to the imaging plane of the camera, so as to obtain the coordinates of the at least two vertices of the text picture in the video frame.

In an actual implementation, the original two-dimensional coordinates of the at least two vertices of the text picture may be determined according to the shape, size and display position of the text picture. For example, when the text picture is a rectangle, the length of the text picture is w, the width of the text picture is H, and the height from the text picture to the nose of the target object is D, the coordinates of four vertices of the text picture are determined as: upper left corner (0, 0), lower left corner (0, h−1), lower right corner (w−1, h−1), and upper right corner (w−1, 0).

As an example, the coordinates of the four vertices of the text picture in the video frame are marked as a point combination A, the original two-dimensional coordinates of the four vertices of the text picture are marked as a point combination B, a transformation matrix M that transforms the point combination B to the point combination A is computed, and then, affine transformation is performed on the text picture through the transformation matrices M to obtain a transformed text picture.

In some embodiments, a terminal may display a text by the following method: generate a special-effect animation corresponding to the text; and play the special-effect animation to display the text.

In an actual implementation, the terminal may generate a special-effect animation according to the text, such as a color-changed special-effect animation and a size-changed special-effect animation. When the face posture of the target object changes, the display posture of the special-effect animation is adjusted with the change of the face posture.

Figure 15:
FIG. 15 is a schematic diagram of a playing interface provided by an embodiment of this application.
Figure 15:
Figure 15:
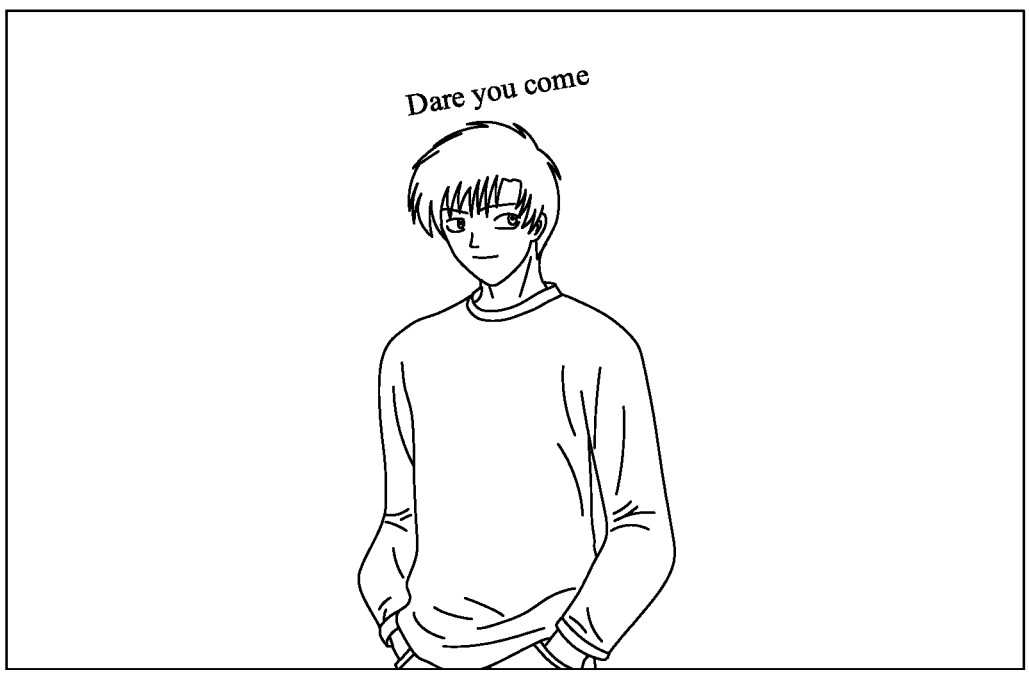

As an example, referring to FIG. 15, FIG. 15 is a schematic diagram of a playing interface provided by an embodiment of this application. When the display posture of a text changes with the face posture, the size of the text also changes dynamically.

In some embodiments, a terminal may further display a text by the following method: perform three-dimensional processing on the text to generate a text in a three-dimensional form; and display the text in a three-dimensional form.

In an actual implementation, the text may be in a three-dimensional form, and three-dimensional processing is performed on the text to generate a text in a three-dimensional form; and affine transformation is performed on the text in a three-dimensional form according to the face posture to obtain a transformed text in a three-dimensional form, so that the display posture of the text corresponding to the transformed text picture is consistent with the face posture.

Figure 16:
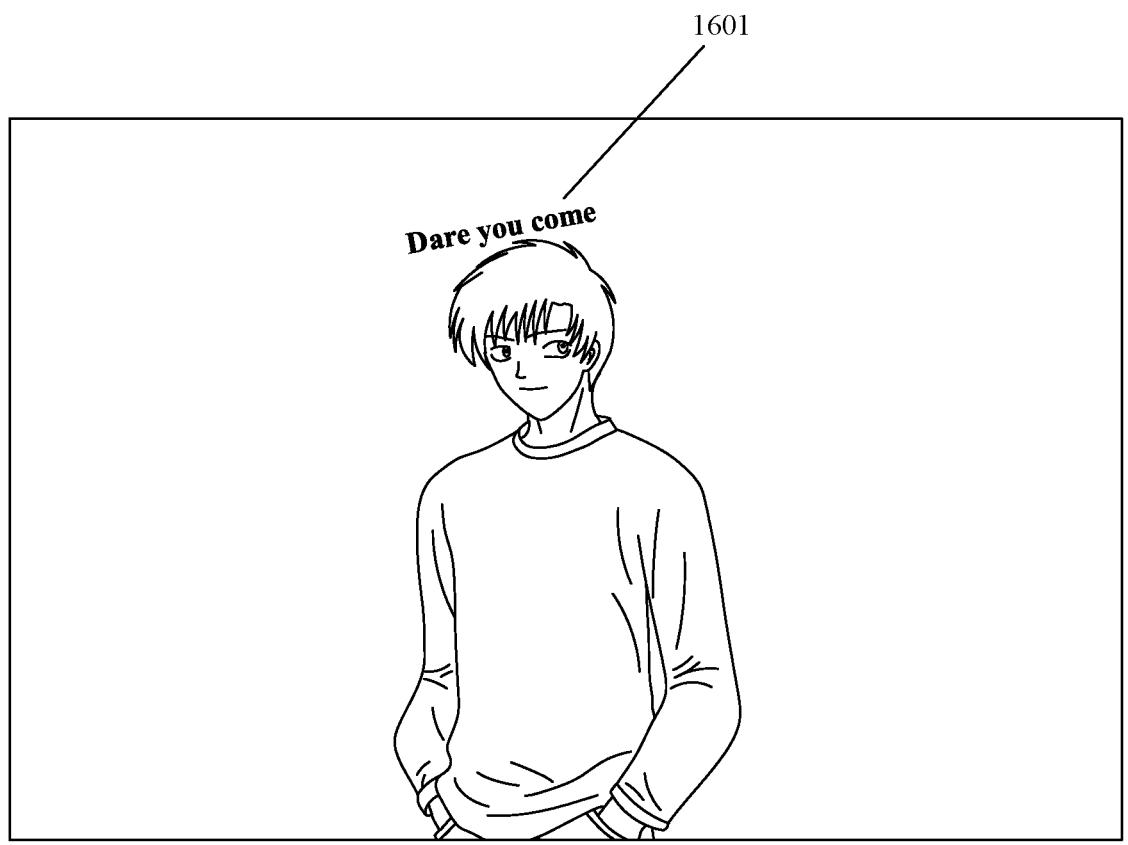
FIG. 16 is a schematic diagram of a playing interface provided by an embodiment of this application.

As an example, referring to FIG. 16, FIG. 16 is a schematic diagram of a playing interface provided by an embodiment of this application. A text 1601 is in a three-dimensional form, and the display posture of the text in a three-dimensional form is consistent with the face posture.

According to the embodiment of this application, a target video is played in a playing interface; the text is displayed in a display region associated with the face of the target object when a video picture of the target video includes a target object and there is a text, associated with the target object, in a process of playing the target video; and the display posture of the text is adjusted with the change of the face posture when the face posture of the target object changes in a process of displaying the text. In this way, the display posture of the text may change with the change of the face posture of the associated target object, so as to realize the associated display of the text and the face of the target object, so that the user may clearly know the target object associated with the text, so as to improve the display pertinence, effectiveness and flexibility of the text.

An exemplary application of the embodiments of this application in an actual application scene is described below. In an actual implementation, after receiving a playing request for a target video, a terminal requests a server for the target video, a text, and the face posture data of the target video; the server sends the target video, the text, and the face posture data of the target video to the terminal, and the terminal performs real-time rendering to play the target video; and in a process of playing the target video, the text, associated with the target object, is displayed in a display region associated with the face of the target object (such as the top of a face region) in a video picture, and the display posture of the text changes synchronously with the change of the face posture of the object. The text may be in a three-dimensional form, or in a conventional form (without geometrical perspective features).

Taking a text, which is bullet-chat screen information, as an example, referring to FIG. 14A, the bullet-chat screen information (text) 1401 associated with the target object is displayed in a head top region of a target object 1402, where the face posture of the target object is matched with the display posture of the bullet-chat screen. In a video playing process, the display posture of the bullet-chat screen changes with the change of the face posture of the target object.

The association relationship between the target object and the bullet-chat screen may be determined by matching the bullet-chat screen with the object in the video picture, or the target object and the bullet-chat screen may be associated by the user when the user publishes the bullet-chat screen.

As an example, when a video picture includes one object, referring to FIG. 6, in a process of playing a target video, a bullet-chat screen function option 601 is presented in a playing interface; when a user taps the bullet-chat screen function option 601, a terminal determines the object in the currently presented video picture as a target object, and presents a bullet-chat screen input box 602 for the target object, that is, the bullet-chat screen input box is presented below a face region of the target object; the user may input bullet-chat screen information in the bullet-chat screen input box; and after receiving the inputted bullet-chat screen information, the terminal uses the bullet-chat screen information as a text, associated with the target object.

As an example, when a video picture includes multiple objects, referring to FIG. 7, in a process of playing a target video, a bullet-chat screen function option 701 is presented in a playing interface; when a user taps the bullet-chat screen function option 701, an object selection box 702 is presented at a face position of each object, and the user may select a target object based on the presented object selection box, such as tapping the object selection box of the target object; after receiving a selection operation on the target object, a terminal presents a bullet-chat screen input box 703 for the target object, that is, the bullet-chat screen input box is presented below a face region of the target object; the user may input bullet-chat screen information in the bullet-chat screen input box; and after receiving the inputted bullet-chat screen information, the terminal uses the bullet-chat screen information as a text, associated with the target object.

Taking a text, which is a caption, as an example, referring to FIG. 14B, the caption 1403 corresponding to the current dialogue content of the target object is displayed in a head top region of the target object 1404, where the face posture of the target object is matched with the display posture of the caption. In a video playing process, the display posture of the bullet-chat screen changes with the change of the face posture of the target object.

Figure 17:
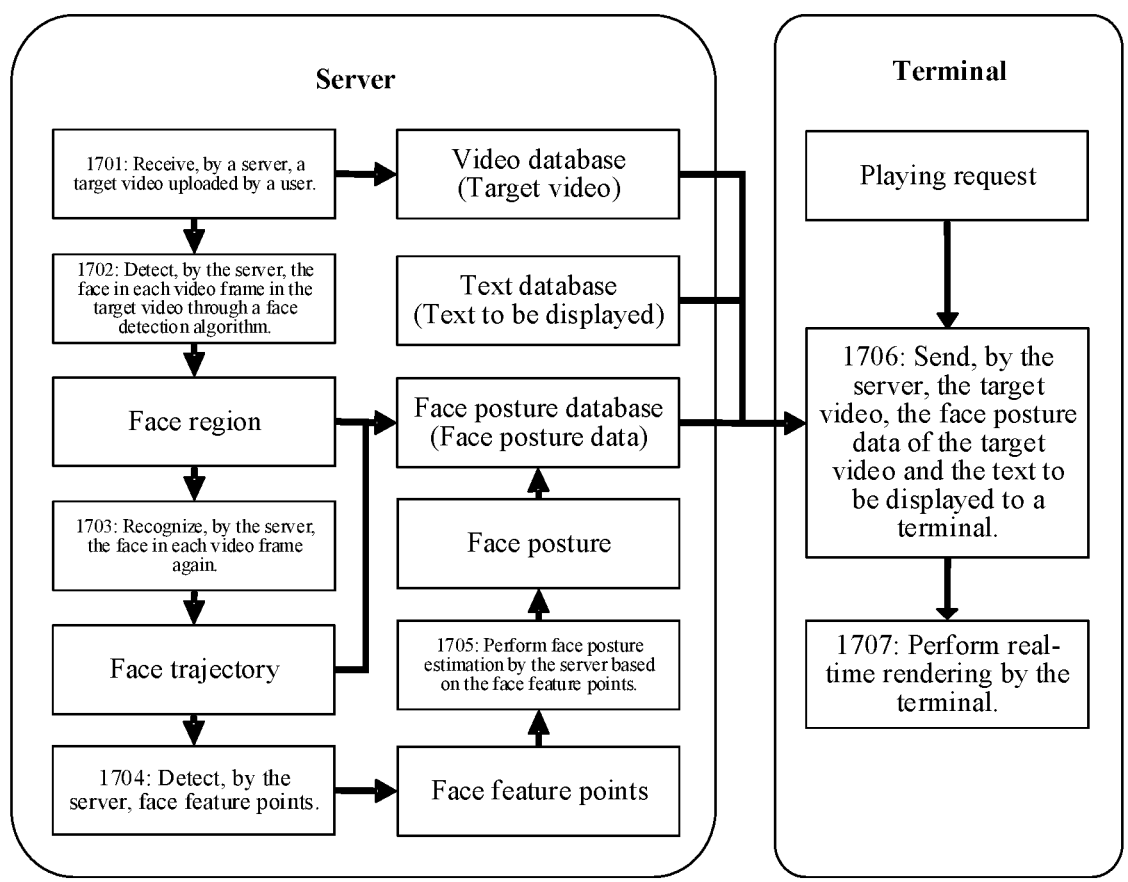
FIG. 17 is a schematic diagram of a video playing process provided by an embodiment of this application.

An implementation process of the above scheme is described in detail below. FIG. 17 is a schematic diagram of a video playing process provided by an embodiment of this application. Referring to FIG. 17, the video playing process provided by an embodiment of this application includes:

Step 1701: Receive, by a server, a target video uploaded by a user.

Step 1702: Detect, by the server, the face in each video frame in the target video through a face detection algorithm.

Step 1703: Recognize, by the server, the face in each video frame again.

Here, the face may be recognized again by a star recognition algorithm to obtain a face trajectory. It can be understood that the face trajectory corresponds to an object, that is, when the target video includes multiple objects, the face trajectory of each object may be obtained.

Step 1704: Detect, by the server, face feature points.

Here, the feature points of the face are detected based on the face trajectory to obtain the face feature points. The feature points of the face may be detected by a 68-point feature point detection algorithm. For example, the feature points of the face are detected by a face attention network (FAN).

Step 1705: Perform face posture estimation by the server based on the face feature points.

In an actual implementation, face posture estimation may be performed by a camera posture estimation algorithm, for example, face posture estimation may be performed by PNP to obtain a face posture; and then, a smoothing process is performed to obtain a final face posture, that is, a face posture without jittering.

Here, the position (face position), face trajectory and face posture of the face region image in each video frame are stored in a face posture database, and are in one-to-one correspondence to the video.

Step 1706: Send, by the server, the target video, the face posture data of the target video and the text to a terminal.

Here, when a user triggers a playing request corresponding to a target video, the terminal sends an obtaining request for the target video, the face posture data of the target video and the text to the server, and the server searches for the target video, the face posture data of the target video and the text from the database, and then sends the target video, the face posture data of the target video and the text to the terminal.

It is to be understood that the face posture data includes the face position, face trajectory and face posture of each video frame.

Step 1707: Perform real-time rendering by the terminal.

In an actual implementation, according to the obtained face posture data, the terminal renders the text in real time in a display region associated with the face of the corresponding object in the video picture.

A face posture estimation method and a real-time rendering method on a terminal side are respectively described below.

In an actual implementation, the face posture estimation method may be performed by a terminal or a server.

Figure 18:
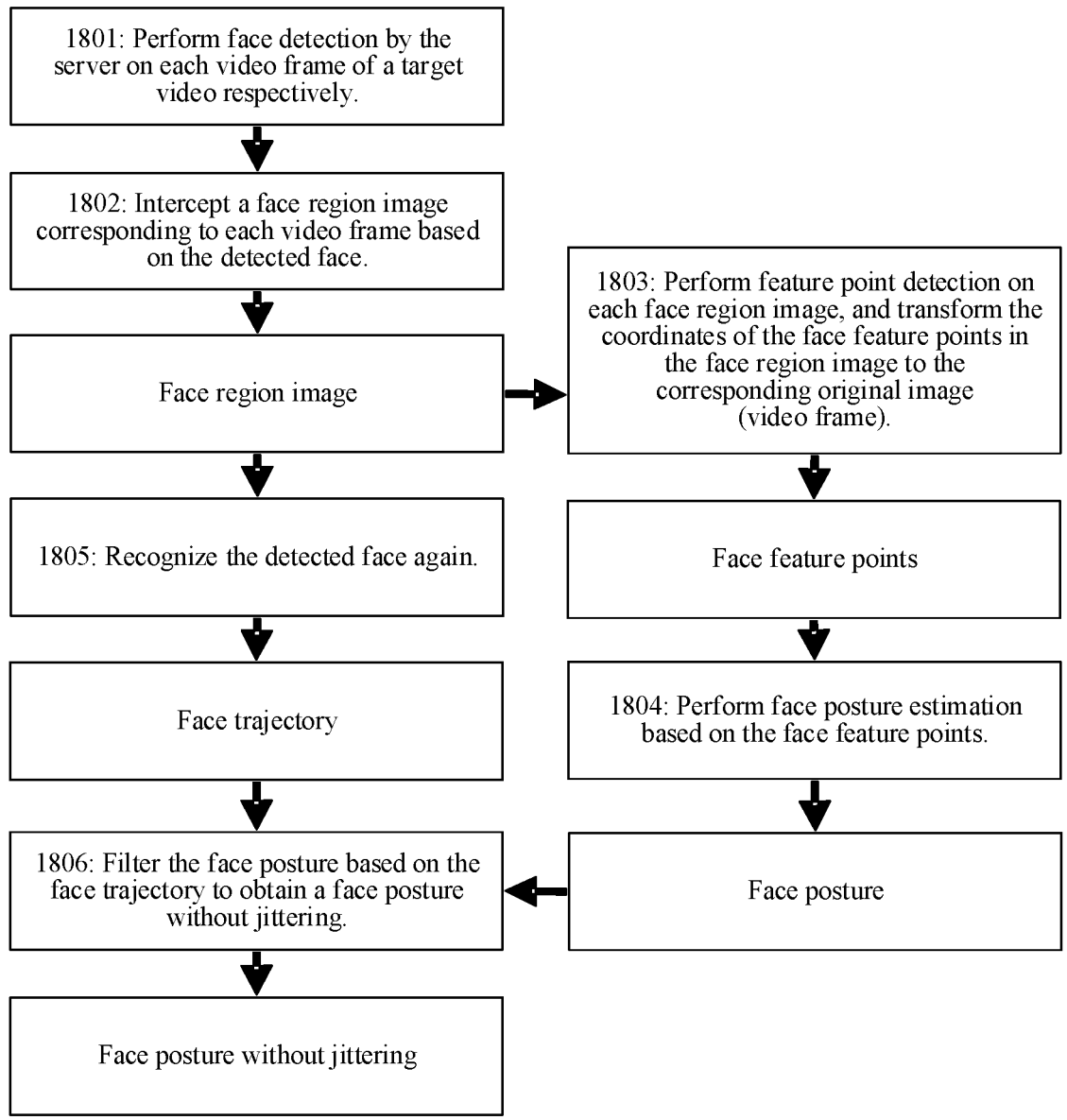
FIG. 18 is a schematic flowchart of a face posture estimation method provided by an embodiment of this application.

Here, a face posture estimation method performed by a server is taken as an example for description. FIG. 18 is a schematic flowchart of a face posture estimation method provided by an embodiment of this application. Referring to FIG. 18, the face posture estimation method provided by the embodiment of this application includes:

Step 1801: Perform face detection by the server on each video frame of a target video respectively.

For each video frame, face detection is performed on the video frame to detect all faces in the video frame. Here, face detection may be performed by a multi-task convolutional neural network (MTCNN) to obtain the detected face.

Step 1802: Intercept a face region image corresponding to each video frame based on the detected face.

Step 1803: Perform feature point detection on each face region image, and transform the coordinates of the face feature points in the face region image to the corresponding original image (video frame).

Here, feature point detection is performed on each face region image to determine the coordinates of each face feature point in the face region image; and then, based on the position of the face region image in the video frame, the coordinates of the face feature points are transformed to determine the coordinates of each face feature point in the video frame.

Step 1804: Perform face posture estimation based on the face feature points.

In an actual implementation, first, an internal parameter of a camera, that is, a focal length of a lens, is obtained. If the focal length of the lens is unknown, a preset value (the same as the height of an image) is set manually, or the video frame is automatically detected by an algorithm to obtain the internal parameter of the camera; then, multiple face feature points are selected to compute an external parameter of the camera (that is, face posture), and six face feature points may be selected, such as the left corner of the left eye, the right corner of the right eye, the left corner of the mouth, the right corner of the mouth, the tip of the nose, and the chin; subsequently, in a shot physical three-dimensional environment, a head coordinate system is established, and the coordinates of the default six face feature points in the head coordinate system are set; and then, the coordinates of the six face feature points in the face coordinate system (coordinates of three-dimensional feature points), the coordinates of the face feature points in the video frame (coordinates of two-dimensional feature points), and the focal length of the lens are substituted into a PNP algorithm, so as to compute the face posture.

The coordinates of the default feature points in the head coordinate system may be set as: the tip of the nose (0.0, 0.0, 0.0), the chin (0.0, −330.0, −65.0), the left corner of the left eye (−225.0, 170.0, −135.0), the right corner of the right eye (225.0, 170.0, −135.0), the left corner of the mouth (−150.0, −150.0, −125.0), and the right corner of the mouth (150.0, −150.0, −125.0).

Step 1805: Recognize the detected face again.

Here, by recognizing the face in each video frame again, the object to which each face belongs is determined, and a face trajectory is obtained according to the position of the same object in consecutive video frames.

In an actual implementation, if the face of an object is not detected in M video frames, but the face of the object is detected in two video frames before and after the M video frames, and in the two video frames before and after the M video frames, the face position of the object (the position of the face frame) is close enough, the face data (face position, face posture, etc.) of an intermediate frame is supplemented by an interpolation method, where M is a natural number, for example, M may be 2.

If the face of an object is detected in a video frame, but the face positions corresponding to the two video frames before and after the video frame jump (in two adjacent video frames, the distance between the face positions exceeds a distance threshold, such as 5% of an image height), it is considered that the face detection of the video frame fails, and correct face data in the video frame is obtained by an interpolation method through the face data in the two video frames before and after the video frame.

If there is no face in N consecutive video frames, it is considered that the video picture is switched, and the face trajectory is divided into two sections according to the switching time, where N is a natural number, and N is greater than M, for example, M is 2 and N is 3.

Step 1806: Filter the face posture based on the face trajectory to obtain a face posture without jittering.

For each section of the face trajectory, a face posture sequence corresponding to the face trajectory is obtained, where the face posture in the face posture sequence includes six dimensions of data; and each dimension of data in the face posture sequence is filtered respectively to filter out jittering. Extended Kalman filtering may be used for filtering each dimension of data, and a value of a start time point of the face trajectory is used as an initial value of the extended Kalman filtering to ensure that filtering results are normally available at the start time of each section of the trajectory.

After the face posture without jittering is obtained, according to the order of video frames, the information, such as the face position, face posture, face ID (identification object), serial number of the video frame, video ID and focal length of the lens, detected in each video frame are stored in a face posture database and subsequently sent to the terminal for use.

Figure 19:
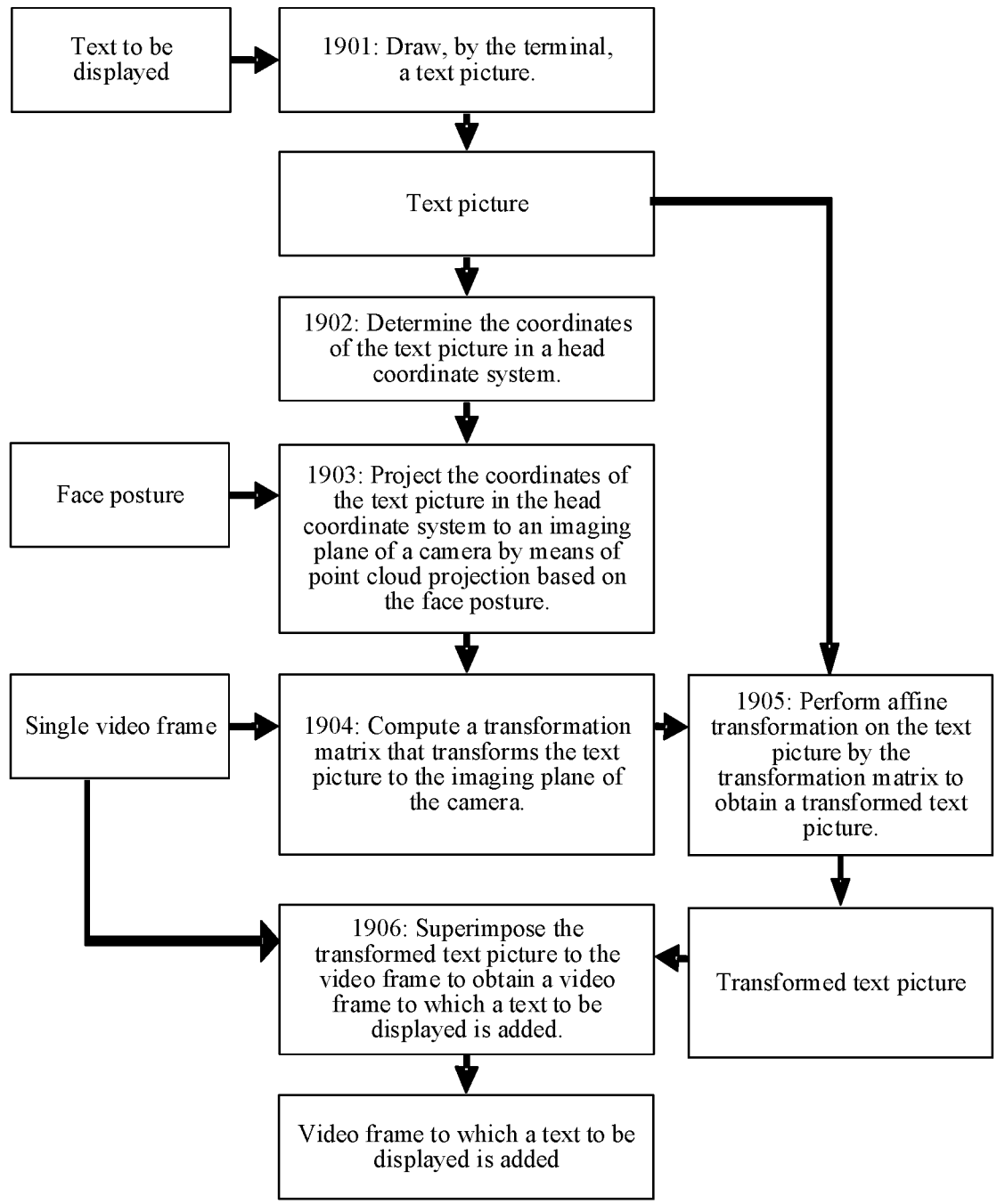
FIG. 19 is a schematic diagram of a real-time rendering process provided by an embodiment of this application.

Referring to FIG. 19, FIG. 19 is a schematic diagram of a real-time rendering process provided by an embodiment of this application. A process of performing real-time rendering by a terminal on a text includes:

Step 1901: Draw, by the terminal, a text picture.

The text picture is drawn according to the text content of a text, where during drawing, word wrap is optional, that is, after a character size reaches a given threshold, a new line symbol is automatically added, the word has a transparent channel, and a non-word region is transparent.

Step 1902: Determine the coordinates of the text picture in a head coordinate system.

Figure 20:
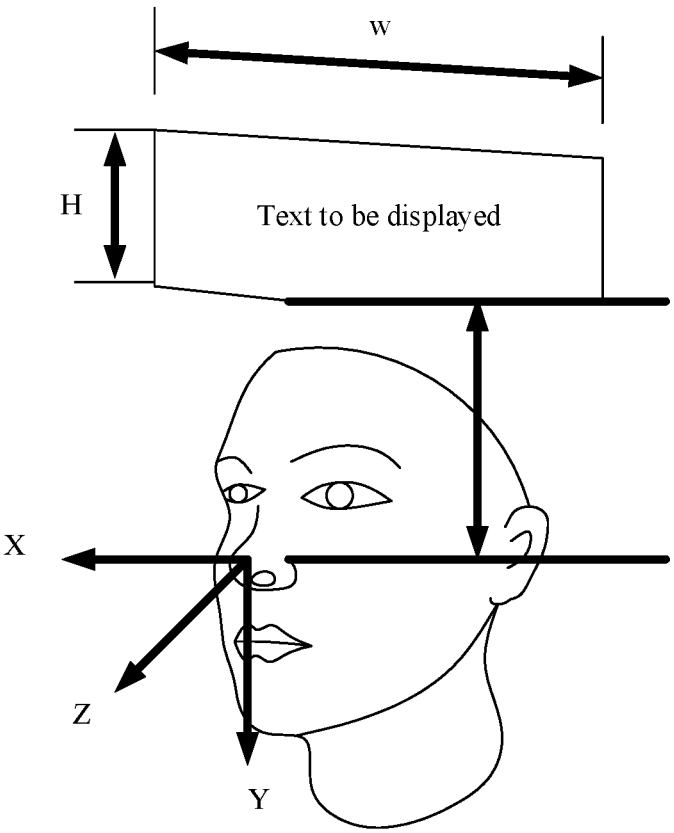
FIG. 20 is a schematic diagram of a text picture in a head coordinate system provided by an embodiment of this application.

Here, taking a text picture which is drawn on the head top of a target object as an example, FIG. 20 is a schematic diagram of a text picture in a head coordinate system provided by an embodiment of this application. Referring to FIG. 20, in the head coordinate system, a height D (y-axis direction) from the text picture to the nose is fixed, a height H of the text picture is fixed, and then, according to an aspect ratio r of the text picture, a width W of the text picture in the head coordinate system is computed, where W=Hr. For example, D may be set to 125, and H may be set to 40.

Correspondingly, the coordinates of four vertices of the text picture in the head coordinate system may be determined as: upper left corner (−W/2, −D−H, 0), lower left corner (−W/2, −D, 0), lower right corner (W/2, −D, 0), and upper right corner (W/2, −D−H, 0).

Step 1903: Project the coordinates of the text picture in the head coordinate system to an imaging plane of a camera by means of point cloud projection based on the face posture.

In an actual implementation, the coordinates of four vertices of the text picture in the head coordinate system are projected to the imaging plane of the camera by means of point cloud projection, so as to obtain the coordinates of the four vertices of the text picture in the video frame, and the coordinates of the four vertices in the video frame form a point combination A.

In an actual application, the three-dimensional coordinates of the text picture in a camera coordinate system are computed based on the face posture; and then, the three-dimensional coordinates of the text picture in the camera coordinate system are projected to the imaging plane of the camera.

Step 1904: Compute a transformation matrix that transforms the text picture to the imaging plane of the camera.

In an actual implementation, the original two-dimensional coordinates of the four vertices of the text picture are: upper left corner (0, 0), lower left corner (0, h−1), lower right corner (w−1, h−1), and upper right corner (w−1, 0), and the original two-dimensional coordinates of the four vertices form a point combination B. Here, a transformation matrix M that transforms the point combination B to the point combination A is computed.

Step 1905: Perform affine transformation on the text picture by the transformation matrix to obtain a transformed text picture.

Step 1906: Superimpose the transformed text picture to the video frame to obtain a video frame to which a text is added.

According to the embodiment of this application, when the text is displayed, the text may change with the face posture of the target object, so that the user may clearly know the target object associated with the text; and furthermore, the terminal may simply and quickly draw a three-dimensional text picture with a geometrical perspective relationship, which avoids the introduction of excessive computing capacity while ensuring that the user may have better interactive experience, and guarantees low power consumption, thereby being suitable for various terminals.

Figure 21:
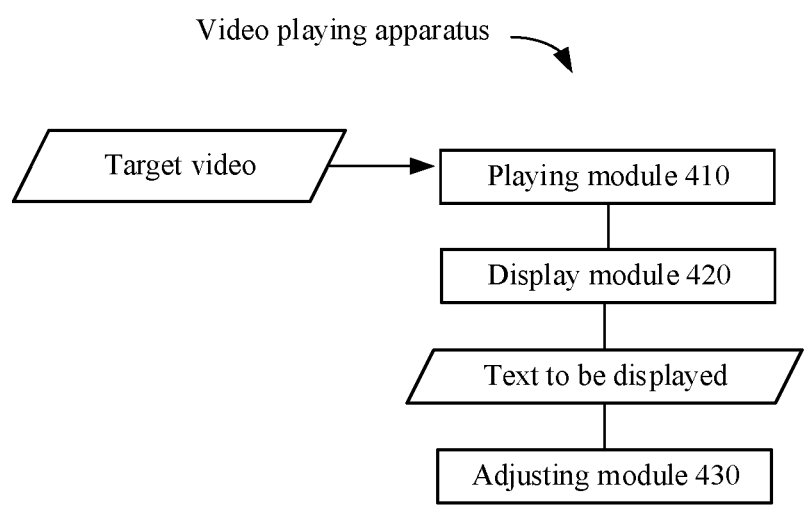
FIG. 21 is a schematic structural diagram of a video playing apparatus provided by an embodiment of this application.

The following continues to describe a video playing apparatus provided by an embodiment of this application. Referring to FIG. 21, FIG. 21 is a schematic structural diagram of a video playing apparatus provided by an embodiment of this application. The video playing apparatus provided by the embodiment of this application includes:

a playing module 410 configured to play a target video in a playing interface;

a display module 420 configured to display the text in a display region associated with the face of the target object when a video picture of the target video includes a target object and there is a text, associated with the target object, in a process of playing the target video; and an adjusting module 430 configured to adjust the display posture of the text with the change of the face posture when the face posture of the target object changes in a process of displaying the text.

In some embodiments, the display module is further configured to present object selection boxes in the video picture of the target video when the video picture of the target video includes at least two objects in response to a trigger operation on a bullet-chat screen function option in the playing interface;

receive a selection operation on the target object based on the object selection boxes;

present a bullet-chat screen input box corresponding to the target object in response to the selection operation; and receive bullet-chat screen information inputted based on the bullet-chat screen input box, and use the bullet-chat screen information as the text, associated with the target object.

In some embodiments, the display module is further configured to present a bullet-chat screen input box in the video picture of the target video in response to a trigger operation on a bullet-chat screen function option in the playing interface;

receive bullet-chat screen information inputted based on the bullet-chat screen input box, and use the bullet-chat screen information as the text;

match the text with each of the objects respectively when the video picture of the target video includes at least two objects, determine an object matched with the text, and use the matched object as the target object; and associate the bullet-chat screen information with the target object.

In some embodiments, the display module is further configured to present at least two colors in response to an editing operation on the text in the playing interface;

determine the target color as a color for displaying the text in response to a selection operation on a target color in the at least two colors; and display the text by the target color.

In some embodiments, the display module is further configured to identify a display region associated with the face of the target object in response to a first position adjusting instruction for the text; and control the text to move in the display region associated with the target object in response to a drag operation on the text, so as to adjust a display position of the text in the display region.

In some embodiments, the display module is further configured to determine a display region matched with the text content in the at least two display regions based on the text content of the text when there are at least two display regions associated with the face of the target object; and display the text in the display region matched with the text content.

In some embodiments, the display module is further configured to play the at least two texts in sequence in a display region associated with the face of the target object when there are at least two texts, associated with the target object.

In some embodiments, the display module is further configured to identify the at least two display regions in response to a second position adjusting instruction for the text when there are at least two display regions associated with the face of the target object; and use the display region corresponding to the selection operation as the display region corresponding to the text in response to a selection operation triggered based on the at least two display regions.

In some embodiments, the display module is further configured to obtain caption information corresponding to the target video and an object in the video picture to which the caption information belongs; and use the caption content as the text, associated with the target object when the caption information includes the caption content belonging to the target object.

In some embodiments, the display module is further configured to obtain a size of a face region of the target object; and determine a display region associated with the face of the target object based on the size of the face region, so as to enable the size of the display region to be matched with the size of the face region.

In some embodiments, the display module is further configured to determine a user level of the user corresponding to each piece of bullet-chat screen information when there are at least two pieces of bullet-chat screen information and the at least two pieces of bullet-chat screen information correspond to at least two users; and display the bullet-chat screen information based on the user level.

In some embodiments, the display module is further configured to respectively determine a display region corresponding to each text when there are multiple texts, associated with the target object; and display the corresponding text respectively through each of the display regions.

In some embodiments, the display module is further configured to generate a special-effect animation corresponding to the text; and play the special-effect animation to display the text.

In some embodiments, the display module is further configured to perform three-dimensional processing on the text to generate a text in a three-dimensional form; and display the text in a three-dimensional form.

In some embodiments, the display module is further configured to display the text by a display color matched with the video picture of the target video.

In some embodiments, the adjusting module is further configured to determine that the face posture of the target object changes when the face of the target object rotates; and control the text to rotate synchronously with the face of the target object with the change of the face posture according to a rotation direction and a rotation angle of the face of the target object, so as to adjust the display posture of the text.

According to the embodiments of this application, the display posture of the text may change with the change of the face posture of the associated target object, so as to realize the associated display of the text and the face of the target object, and improve the display effectiveness and flexibility of the text.

Figure 22:
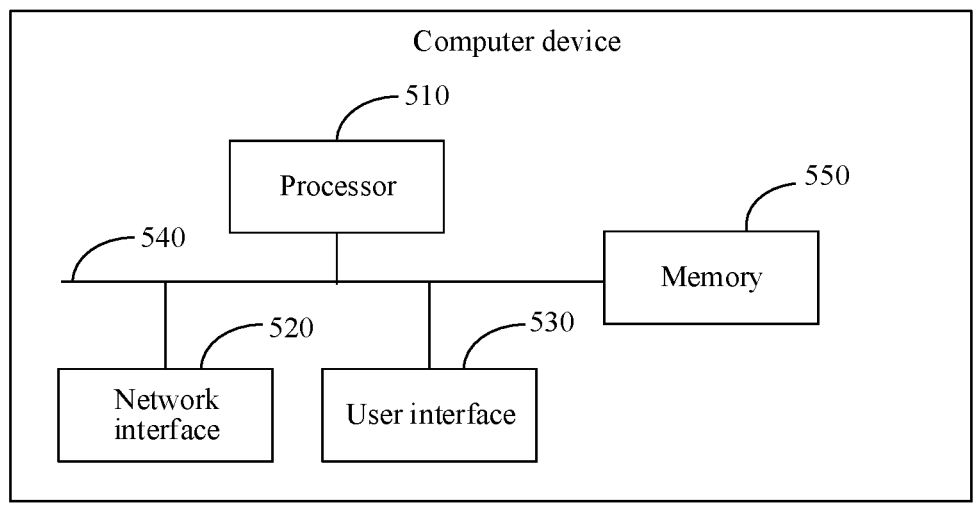
FIG. 22 is a schematic structural diagram of a computer device provided by an embodiment of this application.

An embodiment of this application further provides a computer device. The computer device may be a terminal or a server. Referring to FIG. 22, FIG. 22 is a schematic structural diagram of a computer device provided by an embodiment of this application. The computer device provided by the embodiment of this application includes:

a memory 550, configured to store executable instructions; and a processor 510, configured to implement, when executing the executable instructions stored in the memory, the information display method provided by the embodiment of this application.

The processor 510 herein may be an integrated circuit chip having a signal processing capability, such as a general-purpose processor, a digital signal processor (DSP), or another programmable logic device, discrete gate, transistor logical device, or discrete hardware component. The general-purpose processor may be a microprocessor, any conventional processor, or the like.

The memory 550 may be a removable memory, a non-removable memory, or a combination thereof. Exemplary hardware devices include a solid-state memory, a hard disk drive, an optical disc driver, or the like. The memory 550 optionally includes one or more storage devices physically away from the processor 510.

The memory 550 includes a volatile memory or a non-volatile memory, or may include both a volatile memory and a non-volatile memory. The non-volatile memory may be a read-only memory (ROM). The volatile memory may be a random access memory (RAM). The memory 550 described in the embodiment of this application aims to include any suitable type of memories.

In some embodiments, at least one network interface 520, and a user interface 530 may further be included. All the components in the computer device 500 are coupled together via a bus system 540. It may be understood that the bus system 540 is configured to implement connection and communication between the components. In addition to a data bus, the bus system 540 further includes a power bus, a control bus, and a status signal bus. However, for ease of clear description, all types of buses in FIG. 22 are marked as the bus system 540.

An embodiment of this application provides a computer program product or a computer program, including computer instructions, the computer instructions being stored in a computer-readable storage medium. A processor of a computer device reads the computer instructions from the computer-readable storage medium, and executes the computer instructions, causing the computer device to perform the foregoing video playing method according to the embodiment of this application.

An embodiment of this application provides a computer-readable storage medium storing executable instructions, the executable instructions, when executed by a processor, causing the processor to perform the methods provided by the embodiments of this application.

In some embodiments, the computer-readable storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the executable instructions may be written in any form of programming language (including a compiled or interpreted language, or a declarative or procedural language) by using the form of a program, software, a software module, a script or a code, and may be deployed in any form, including being deployed as an independent program or being deployed as a module, a component, a subroutine, or another unit suitable for use in a computing environment.

As an example, the executable instructions may, but do not necessarily, correspond to a file in a file system, and may be stored in a part of a file that saves another program or other data, for example, be stored in one or more scripts in a hypertext markup language (HTML) file, stored in a single file that is specially used for a discussed program, or stored in a plurality of collaborative files (for example, be stored in files of one or modules, subprograms, or code parts).

As an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely embodiments of this application and are not intended to limit the protection scope of this application. Any modification, equivalent replacement, and improvement made without departing from the spirit and scope of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A video playing method performed by a computer device, comprising:
    playing a target video in a playing interface;
    when a video picture of the target video comprises a target object and there is a text associated with the target object and the text is bullet-chat screen information, displaying the text in a display region associated with a face posture of the target object in a process of playing the target video, wherein the text in the display region has an orientation consistent with an orientation of the face posture of the target object in the video picture, further including:
    when there are at least two pieces of bullet-chat screen information and the at least two pieces of bullet-chat screen information correspond to at least two users, each user having a respective user level, displaying the bullet-chat screen information corresponding to a user of a higher user level; and
    adjusting a display posture of the text with the face posture when the face posture of the target object changes such that there is no relative movement between the text and the target object in a process of displaying the text.

2. The method according to claim 1, wherein the method further comprises:
    before displaying the text in the display region associated with the face posture of the target object:
        in response to a trigger operation on a bullet-chat screen function option in the playing interface, presenting object selection boxes in the video picture of the target video when the video picture of the target video comprises at least two objects;
        receiving a selection operation on the target object based on an object selection box corresponding to the target object;
        presenting a bullet-chat screen input box corresponding to the target object in response to the selection operation; and
        receiving bullet-chat screen information inputted based on the bullet-chat screen input box, and using the bullet-chat screen information as the text associated with the target object.

3. The method according to claim 1, wherein the method further comprises:
    before displaying the text in the display region associated with the face posture of the target object:
        presenting a bullet-chat screen input box in the video picture of the target video in response to a trigger operation on a bullet-chat screen function option in the playing interface;
        receiving bullet-chat screen information inputted based on the bullet-chat screen input box, and using the bullet-chat screen information as the text;
        when the video picture of the target video comprises at least two objects, determining an object matched with the text as the target object; and
        associating the bullet-chat screen information with the target object.

4. The method according to claim 1, wherein the method further comprises:
    before displaying the text in the display region associated with the face posture of the target object:
        presenting at least two colors in response to an editing operation on the text in the playing interface;
        in response to a user selection operation on a target color among the at least two colors, determining the target color as a color for displaying the text; and
        displaying the text by the target color.

5. The method according to claim 1, wherein the method further comprises:
    identifying a display region associated with the face posture of the target object in response to a first position adjusting instruction for the text; and
    controlling the text to move in the display region associated with the target object in response to a drag operation on the text, so as to adjust a display position of the text in the display region.

6. The method according to claim 1, wherein the displaying the text in a display region associated with the face of the target object comprises:
    when there are at least two display regions associated with the face posture of the target object, determining one of the at least two display regions as a display region matched with the text; and
    displaying the text in the display region.

7. The method according to claim 1, wherein the displaying the text in a display region associated with the face of the target object comprises:
    when there are at least two texts associated with the target object, playing the at least two texts in sequence in a display region associated with the face posture of the target object.

8. The method according to claim 1, wherein the method further comprises:
    when there are at least two display regions associated with the face posture of the target object, identifying one of the at least two display regions as a display region corresponding to the text in response to a second position adjusting instruction for the text.

9. The method according to claim 1, wherein the method further comprises:
    before displaying the text in the display region associated with the face posture of the target object:
        obtaining caption information corresponding to the target video and an object in the video picture to which the caption information belongs; and
        using the caption content as the text associated with the target object when the caption information relates to the target object.

10. The method according to claim 1, wherein the displaying the text in a display region associated with the face of the target object comprises:
    determining a respective display region corresponding to each text when there are multiple texts associated with the target object; and
    displaying the corresponding text respectively through each of the display regions.

11. The method according to claim 1, wherein the displaying the text comprises:

generating a special-effect animation corresponding to the text; and playing the special-effect animation along with the display of the text in the display region.

12. The method according to claim 1, wherein the adjusting the display posture of the text with the change of the face posture when the face posture of the target object changes comprises:
determining that the face posture of the target object changes when the target object rotates its orientation; and
controlling the text to rotate synchronously with the target object according to the change of the face posture so as to adjust the display posture of the text.

13. A computer device, comprising:
a memory, configured to store executable instructions; and
a processor, configured to, when executing the executable instructions stored in the memory, cause the computer device to implement a video playing method including:
playing a target video in a playing interface;
when a video picture of the target video comprises a target object and there is a text associated with the target object and the text is bullet-chat screen information, displaying the text in a display region associated with a face posture of the target object in a process of playing the target video, wherein the text in the display region has an orientation consistent with an orientation of the face posture of the target object in the video picture, further including:
when there are at least two pieces of bullet-chat screen information and the at least two pieces of bullet-chat screen information correspond to at least two users, each user having a respective user level, displaying the bullet-chat screen information corresponding to a user of a higher user level; and
adjusting a display posture of the text with the face posture when the face posture of the target object changes such that there is no relative movement between the text and the target object in a process of displaying the text.

14. The computer device according to claim 13, wherein the method further comprises:
before displaying the text in the display region associated with the face posture of the target object:
in response to a trigger operation on a bullet-chat screen function option in the playing interface, presenting object selection boxes in the video picture of the target video when the video picture of the target video comprises at least two objects;
receiving a selection operation on the target object based on an object selection box corresponding to the target object;
presenting a bullet-chat screen input box corresponding to the target object in response to the selection operation; and
receiving bullet-chat screen information inputted based on the bullet-chat screen input box, and using the bullet-chat screen information as the text associated with the target object.

15. The computer device according to claim 13, wherein the method further comprises:
identifying a display region associated with the face posture of the target object in response to a first position adjusting instruction for the text; and
controlling the text to move in the display region associated with the target object in response to a drag operation on the text, so as to adjust a display position of the text in the display region.

16. The computer device according to claim 13, wherein the displaying the text in a display region associated with the face of the target object comprises:
when there are at least two texts associated with the target object, playing the at least two texts in sequence in a display region associated with the face posture of the target object.

17. The computer device according to claim 13, wherein the method further comprises:
before displaying the text in the display region associated with the face posture of the target object:
obtaining caption information corresponding to the target video and an object in the video picture to which the caption information belongs; and
using the caption content as the text associated with the target object when the caption information relates to the target object.

18. The computer device according to claim 13, wherein the adjusting the display posture of the text with the change of the face posture when the face posture of the target object changes comprises:
determining that the face posture of the target object changes when the target object rotates its orientation; and
controlling the text to rotate synchronously with the target object according to the change of the face posture so as to adjust the display posture of the text.

19. A non-transitory computer-readable storage medium storing executable instructions that, when executed by a processor of a computer device, cause the computer device to perform a video playing method including:
playing a target video in a playing interface;
when a video picture of the target video comprises a target object and there is a text associated with the target object and the text is bullet-chat screen information, displaying the text in a display region associated with a face posture of the target object in a process of playing the target video, wherein the text in the display region has an orientation consistent with an orientation of the face posture of the target object in the video picture, further including:
when there are at least two pieces of bullet-chat screen information and the at least two pieces of bullet-chat screen information correspond to at least two users, each user having a respective user level, displaying the bullet-chat screen information corresponding to a user of a higher user level; and
adjusting a display posture of the text with the face posture when the face posture of the target object changes such that there is no relative movement between the text and the target object in a process of displaying the text.

20. The non-transitory computer-readable storage medium according to claim 19, wherein the method further comprises:
identifying a display region associated with the face posture of the target object in response to a first position adjusting instruction for the text; and
controlling the text to move in the display region associated with the target object in response to a drag operation on the text, so as to adjust a display position of the text in the display region.

* * * * *